United States Patent
Byun

(10) Patent No.: US 12,044,589 B2
(45) Date of Patent: Jul. 23, 2024

(54) SENSING DEVICE FOR AVOIDING MAGNETIC FIELD INTERFERENCE

(71) Applicant: LG INNOTEK CO., LTD., Seoul (KR)

(72) Inventor: Sung Wook Byun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 332 days.

(21) Appl. No.: 17/612,269

(22) PCT Filed: May 22, 2020

(86) PCT No.: PCT/KR2020/006695
§ 371 (c)(1),
(2) Date: Nov. 18, 2021

(87) PCT Pub. No.: WO2020/235958
PCT Pub. Date: Nov. 26, 2020

(65) Prior Publication Data
US 2022/0214236 A1    Jul. 7, 2022

(30) Foreign Application Priority Data
May 22, 2019    (KR) .................. 10-2019-0059973

(51) Int. Cl.
G01L 3/10 (2006.01)
G01L 5/22 (2006.01)
B62D 15/02 (2006.01)

(52) U.S. Cl.
CPC .............. *G01L 3/104* (2013.01); *G01L 5/221* (2013.01); *B62D 15/021* (2013.01)

(58) Field of Classification Search
CPC ............ G01L 3/104; G01L 3/10; G01L 5/221
See application file for complete search history.

(56) References Cited

U.S. PATENT DOCUMENTS 8,448,528 B2 * 5/2013 McDonald ............... B62D 6/10
73/862.331
8,624,458 B2 * 1/2014 Jack ....................... H02K 1/145
310/156.55

(Continued)

FOREIGN PATENT DOCUMENTS

CN    106225980 A  * 12/2016
CN    205958165 U  *  2/2017

(Continued)

OTHER PUBLICATIONS

CN 106225980—English translation (Year: 2016).*

(Continued)

*Primary Examiner* — Tran M. Tran
(74) *Attorney, Agent, or Firm* — KED & Associates LLP

(57) ABSTRACT

An embodiment may provide a sensing device including a stator including a stator tooth and a rotor including a magnet, wherein the stator tooth includes a first stator tooth and a second stator tooth disposed inside the first stator tooth, the first stator tooth includes a plurality of first teeth, the second stator tooth includes a plurality of second teeth, the first tooth overlaps the second tooth in a radial direction from a center of the stator, the sensing device further includes a sensor and a collector which are disposed between the first stator tooth and the second stator tooth in the radial direction, the first stator tooth includes a first region corresponding to the collector in a circumferential direction, the second stator tooth includes a second region corresponding to the collector in the circumferential direction, and each of a central angle of the first region and a central angle of the second region is 180° or less.

10 Claims, 45 Drawing Sheets

(56) References Cited

U.S. PATENT DOCUMENTS

| | | | |
|---|---|---|---|
| 9,121,784 B2* | 9/2015 | Ishimoto | G01L 3/104 |
| 9,505,431 B2* | 11/2016 | Yoshida | G01L 3/10 |
| 9,821,846 B2 | 11/2017 | Schoepe et al. | |
| 10,551,259 B2* | 2/2020 | Berner | G01L 5/221 |
| 10,712,217 B2* | 7/2020 | Berner | B62D 15/0215 |
| 10,794,780 B2* | 10/2020 | Paul | G01L 3/104 |
| 11,273,866 B2* | 3/2022 | Murakami | G01L 5/221 |
| 11,325,643 B2* | 5/2022 | Won | B62D 5/0463 |
| 2005/0172727 A1 | 8/2005 | Pattok et al. | |
| 2012/0247179 A1* | 10/2012 | Kerin | G01D 11/245 |
| | | | 73/866.5 |
| 2012/0285266 A1* | 11/2012 | Takahashi | G01L 5/221 |
| | | | 73/862.331 |
| 2013/0305843 A1* | 11/2013 | Lee | B62D 15/0215 |
| | | | 324/207.2 |
| 2014/0283623 A1 | 9/2014 | Song | |

FOREIGN PATENT DOCUMENTS

| | | | | |
|---|---|---|---|---|
| DE | 10 2005 011 196 A1 | | 9/2006 | |
| DE | 102005011196 A1 * | | 9/2006 | B62D 6/10 |
| EP | 3660479 | | 6/2020 | |
| KR | 10-2009-0106186 | | 10/2009 | |
| KR | 10-2010-0092245 | | 8/2010 | |
| KR | 10-2013-0136765 | | 12/2013 | |
| KR | 10-2019-0028123 | | 3/2019 | |
| WO | WO-2018024126 A1 * | | 2/2018 | |
| WO | WO-2018180626 A1 * | | 10/2018 | G01L 3/105 |
| WO | WO 2019/022325 | | 1/2019 | |

OTHER PUBLICATIONS

CN 205958165—English translation (Year: 2017).*
DE 102005011196—English Translation (Year: 2006).*
WO 2018024126—English translation (Year: 2018).*
WO 2018180626—English translation (Year: 2018).*
International Search Report dated Aug. 26, 2020 issued in Application No. PCT/KR2020/006695.
European Search Report dated May 16, 2023 issued in Application No. 20809616.4.
Japanese Office Action dated Apr. 2, 2024 issued in Application 2021-569236.

* cited by examiner

[FIG. 1]
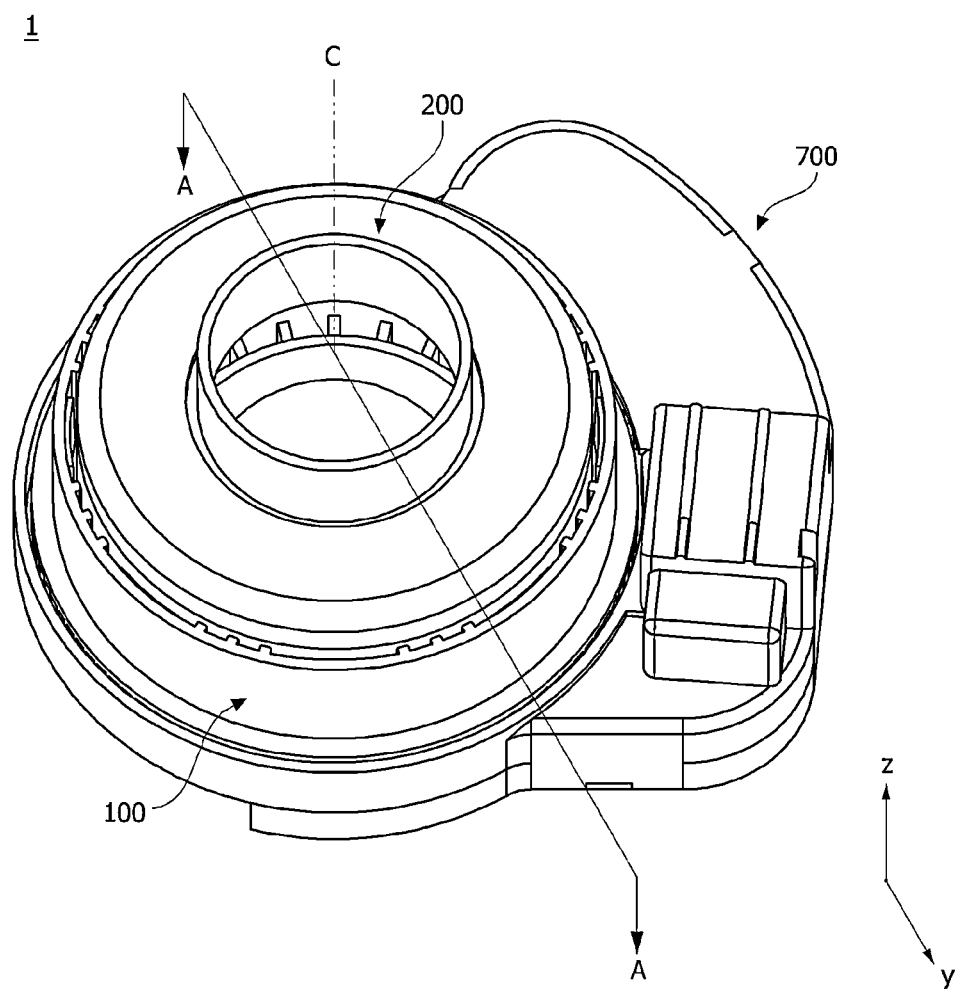

[FIG. 2]
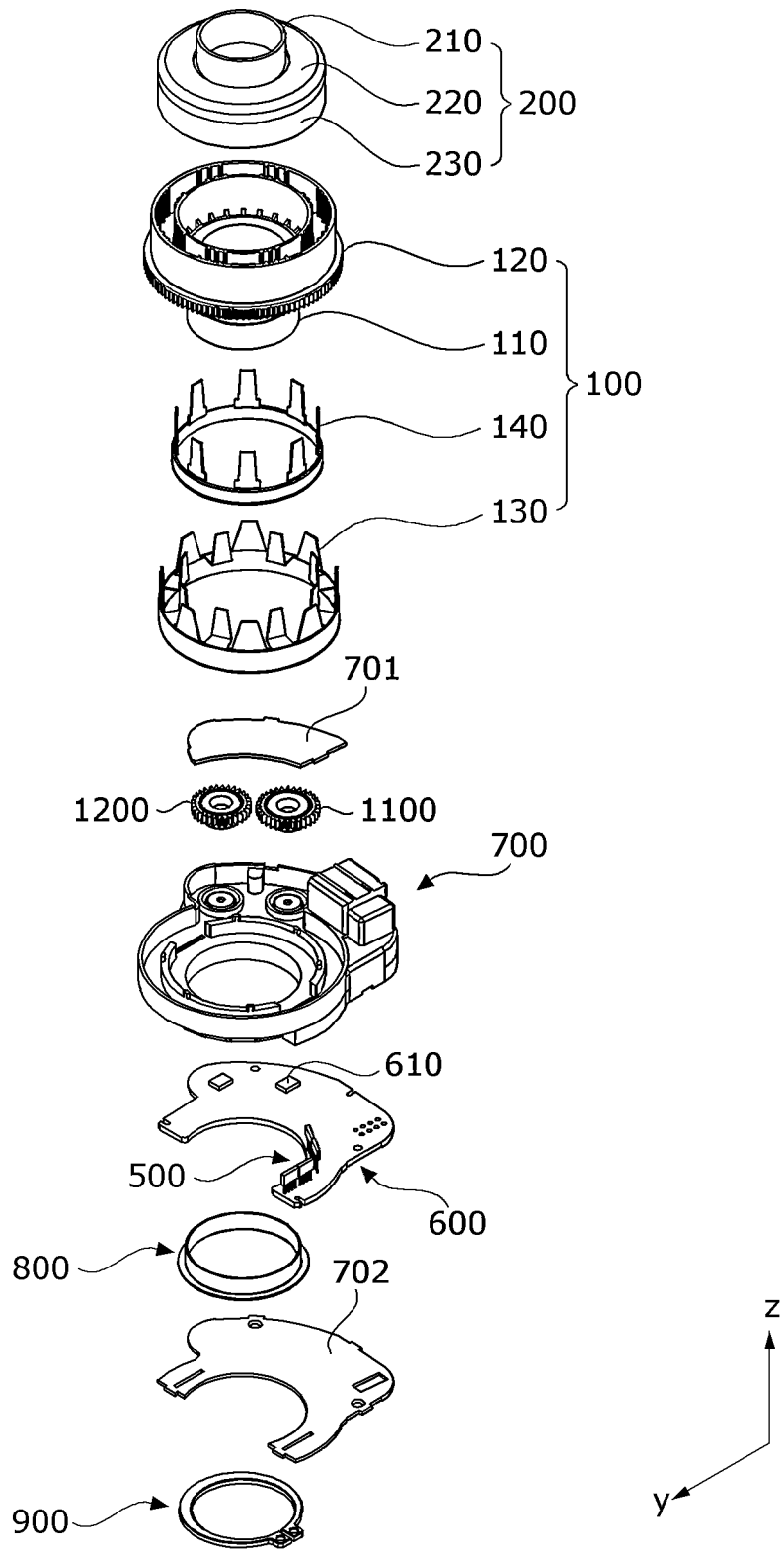

[FIG. 3]
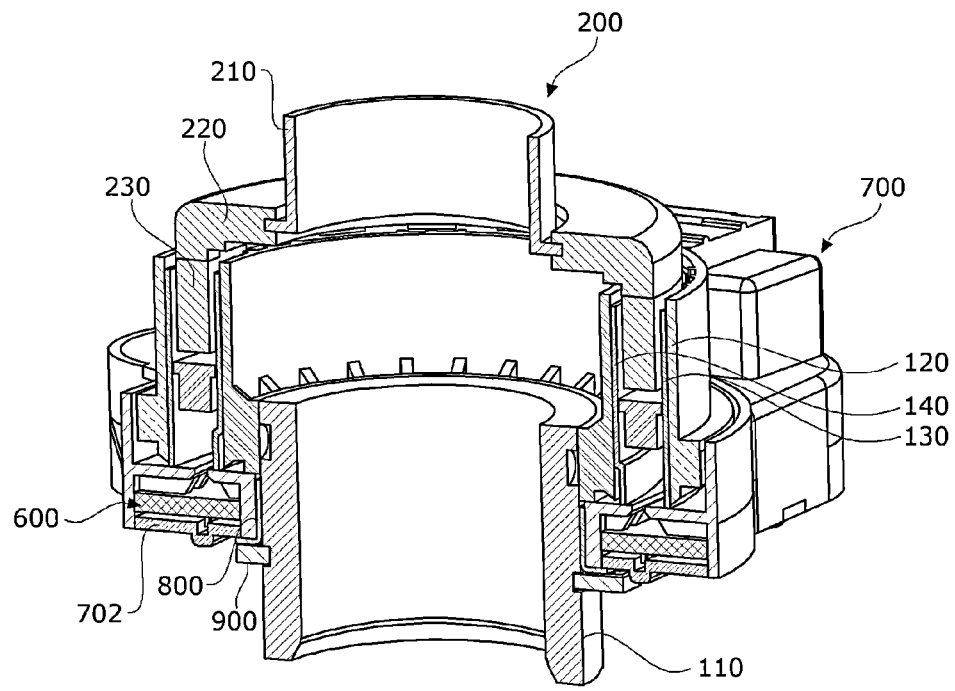

[FIG. 4]
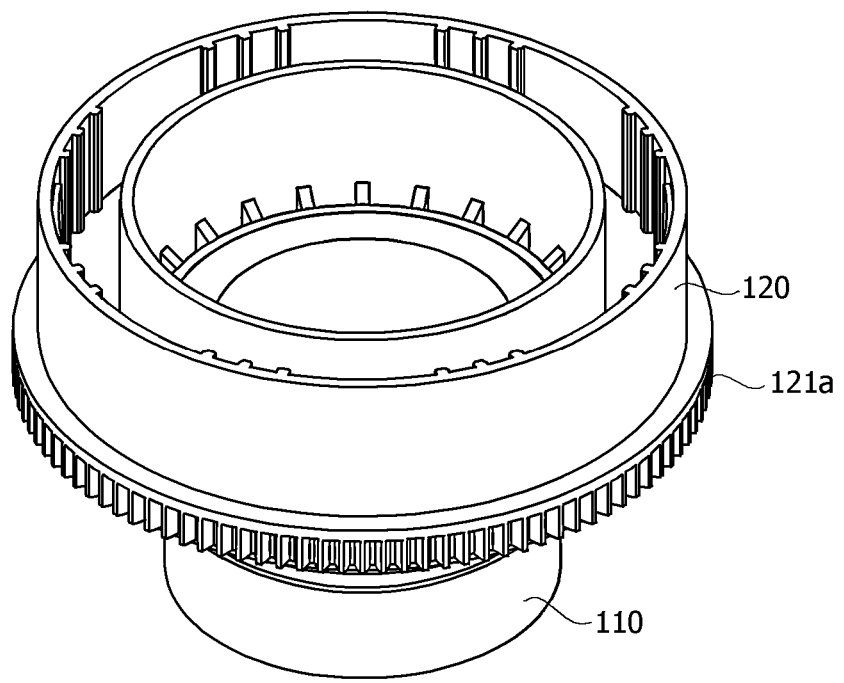

[FIG. 5]
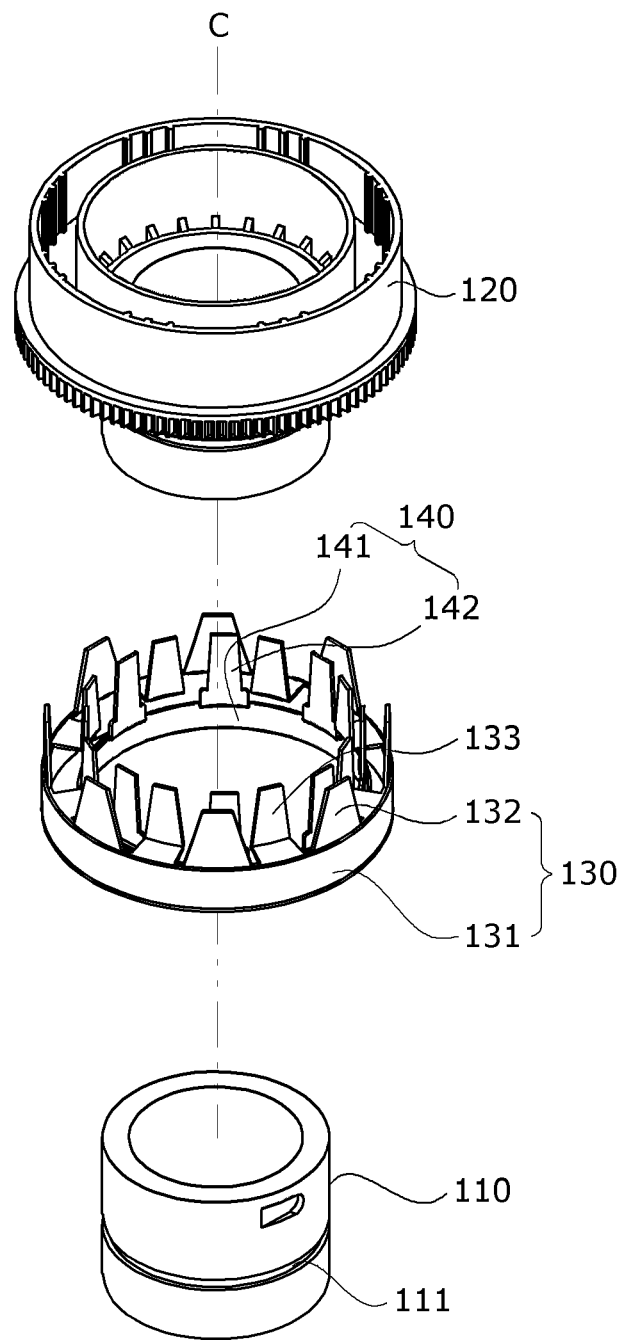

[FIG. 6]
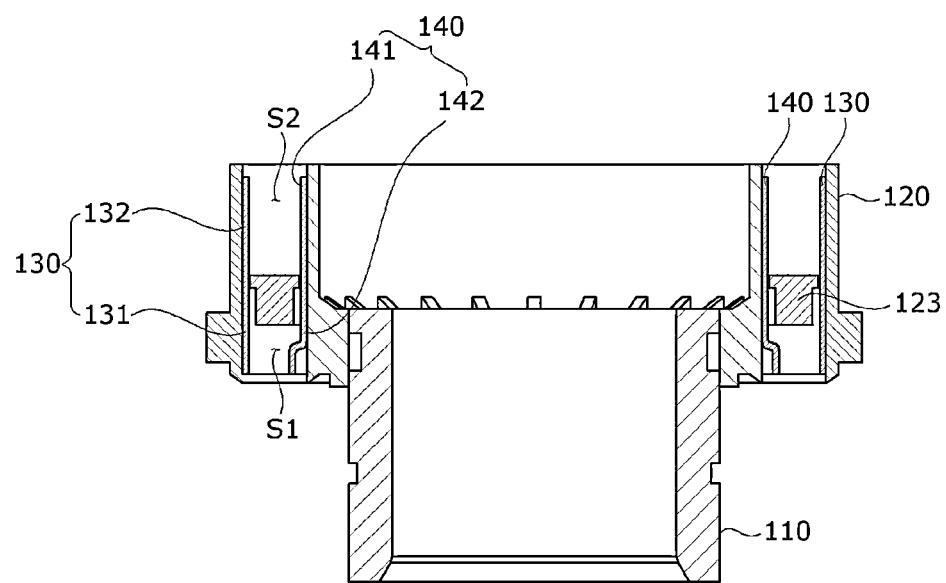

[FIG. 7]
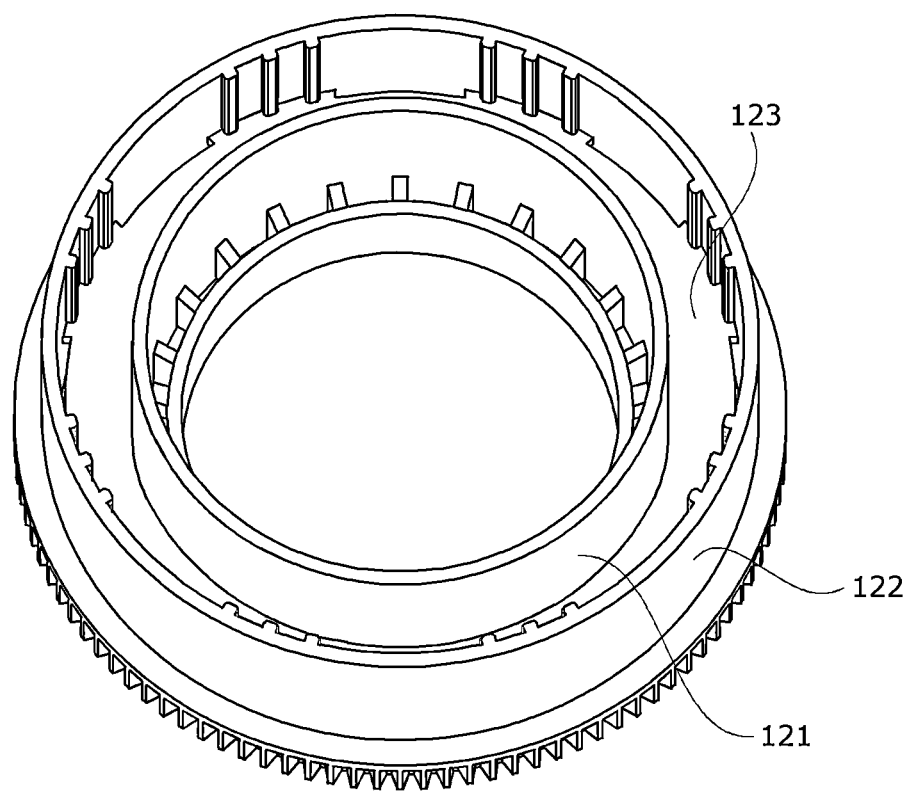

[FIG. 8]
120
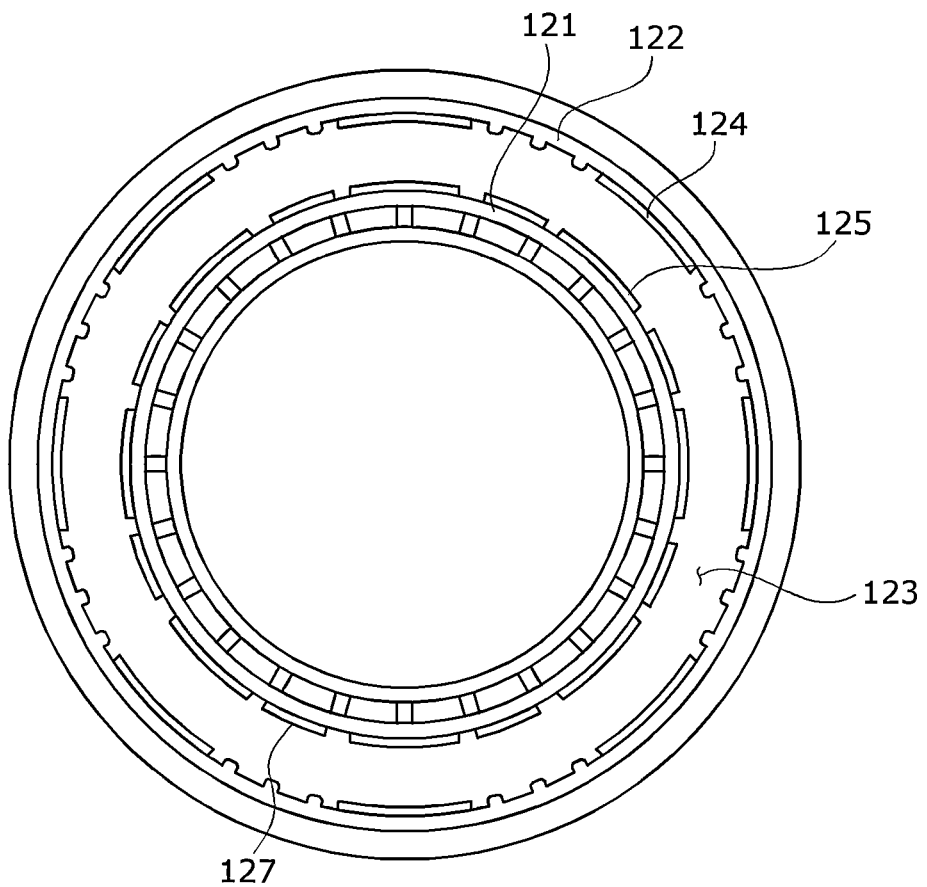

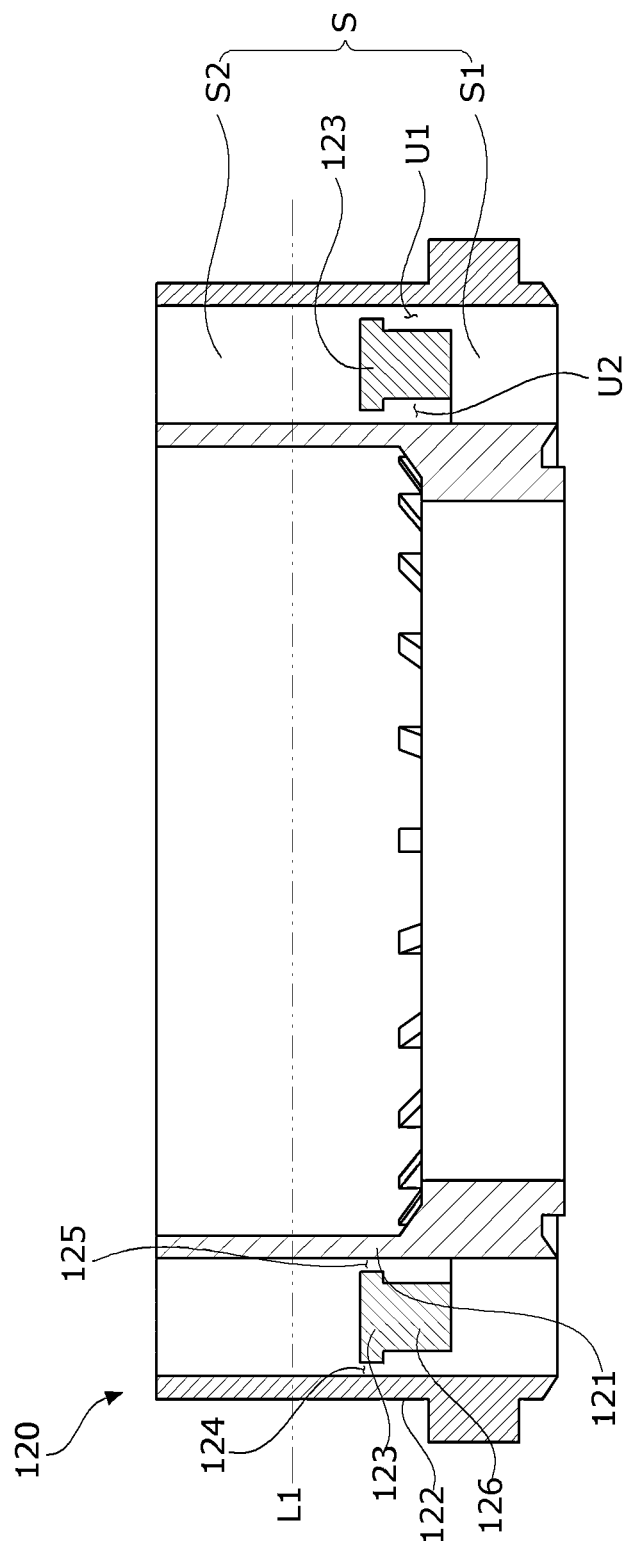
[FIG. 9]

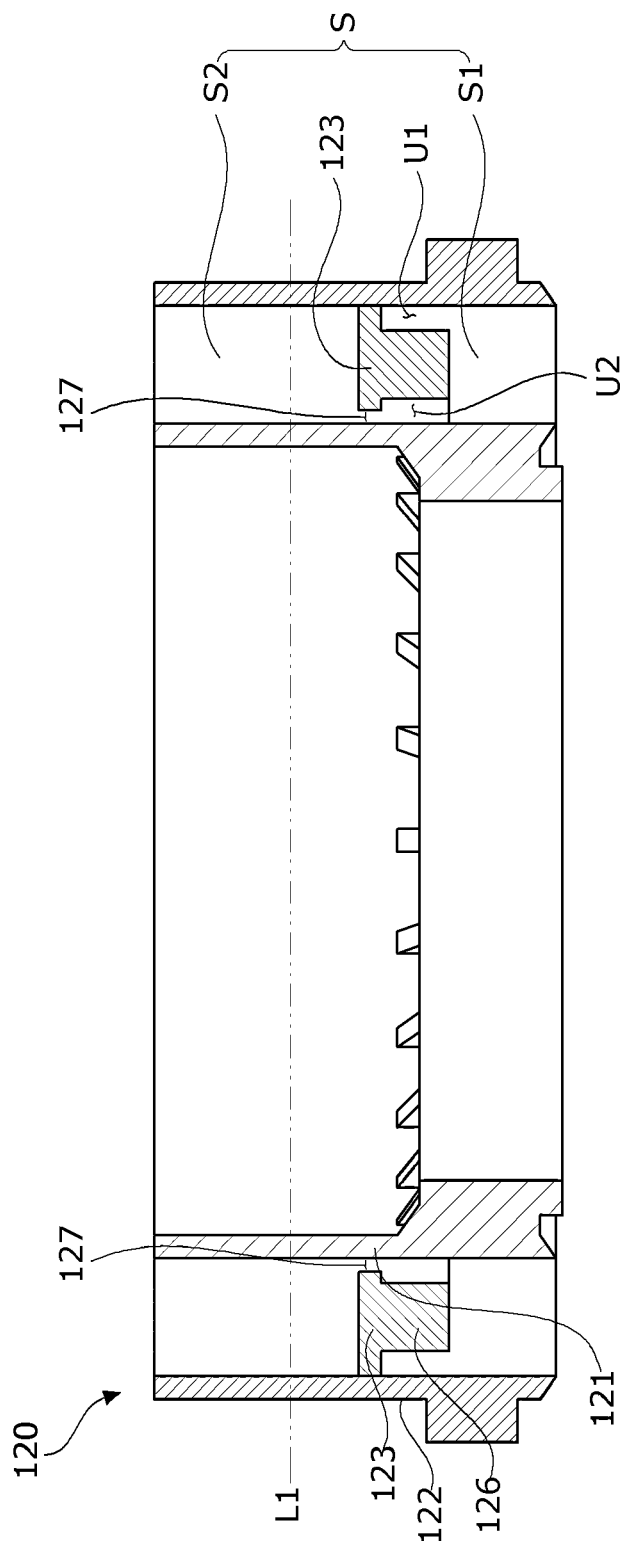
[FIG. 10]

[FIG. 11]
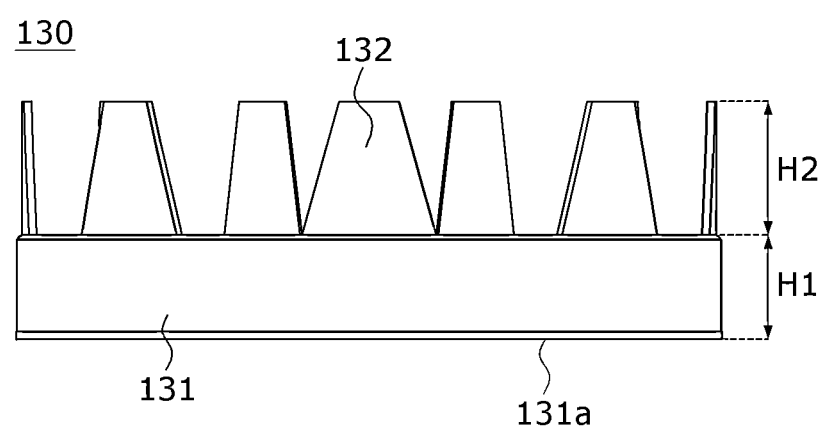

[FIG. 12]
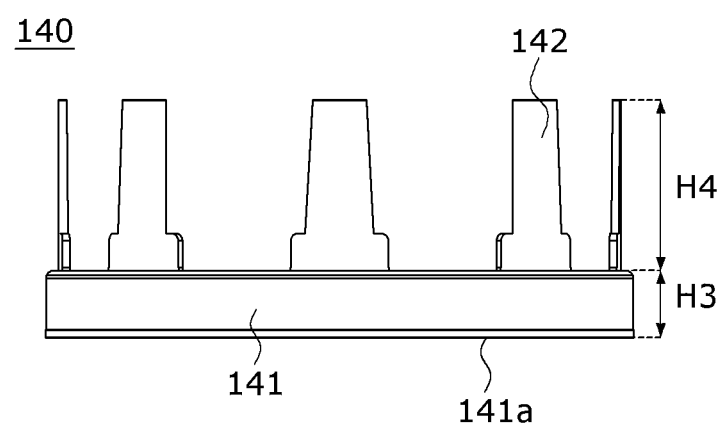

[FIG. 13]
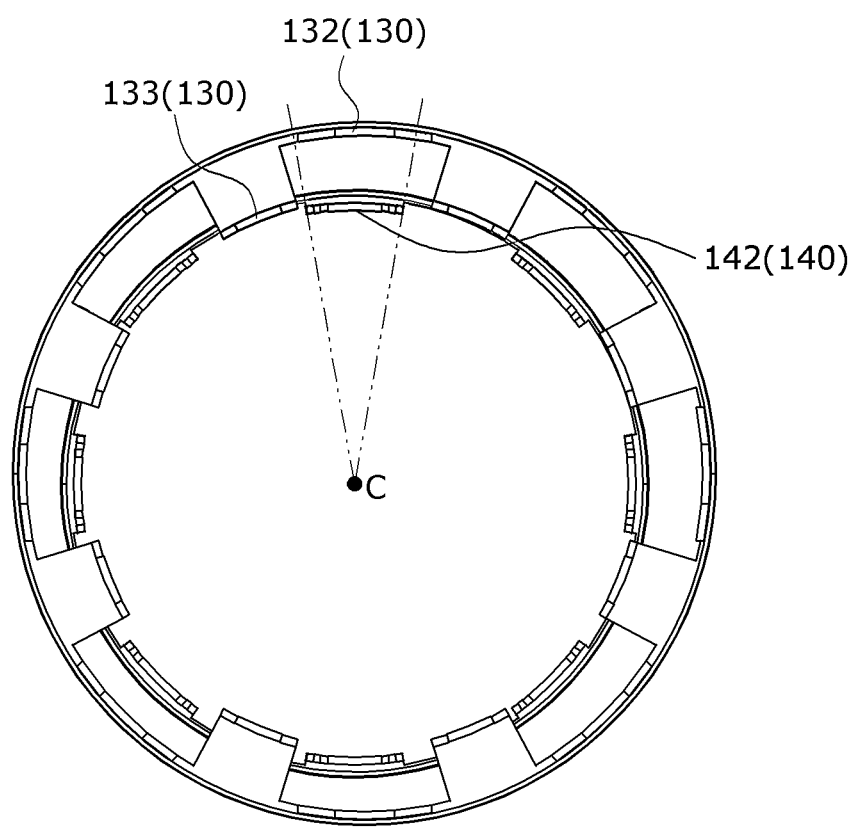

[FIG. 14]
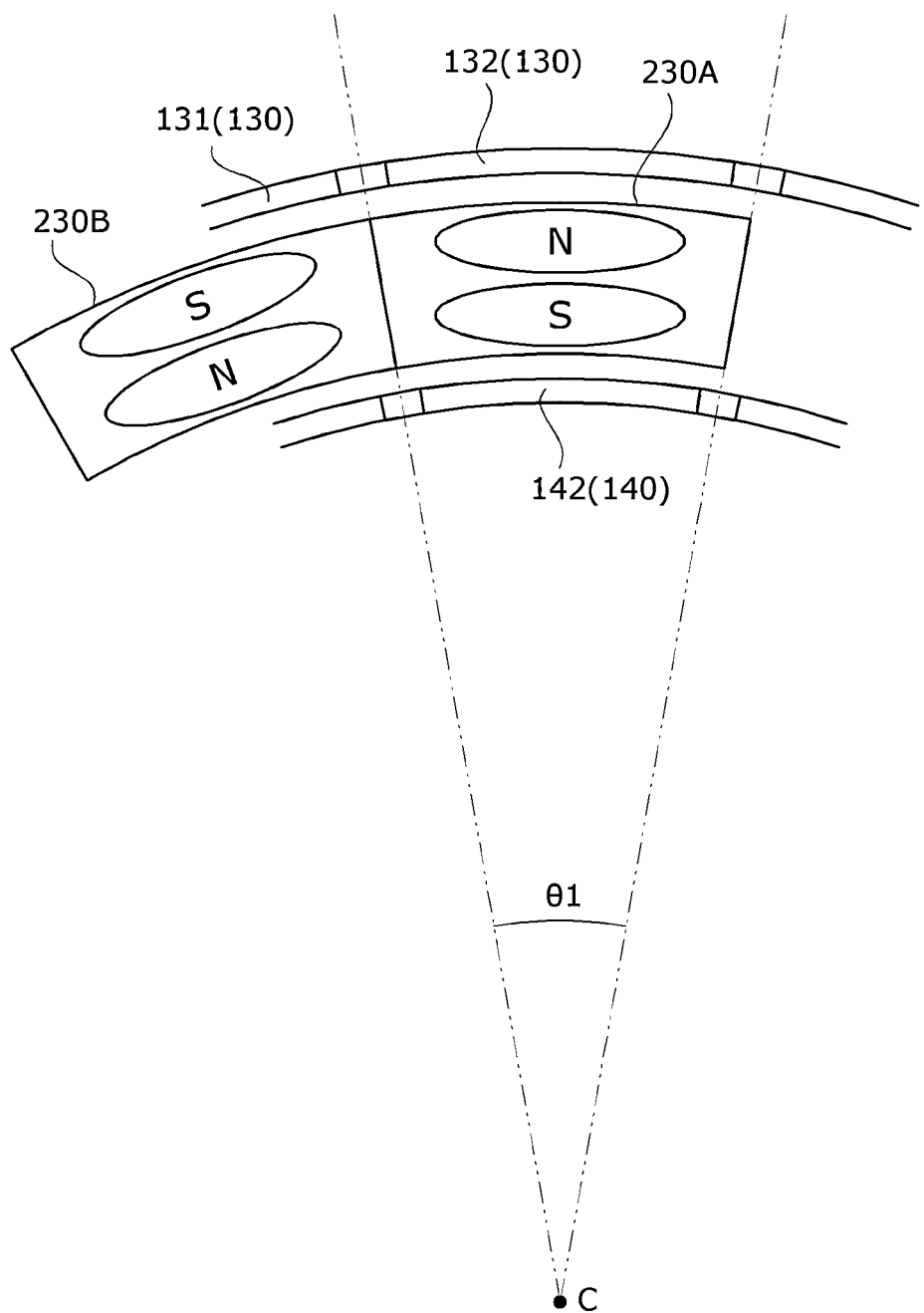

[FIG. 15]
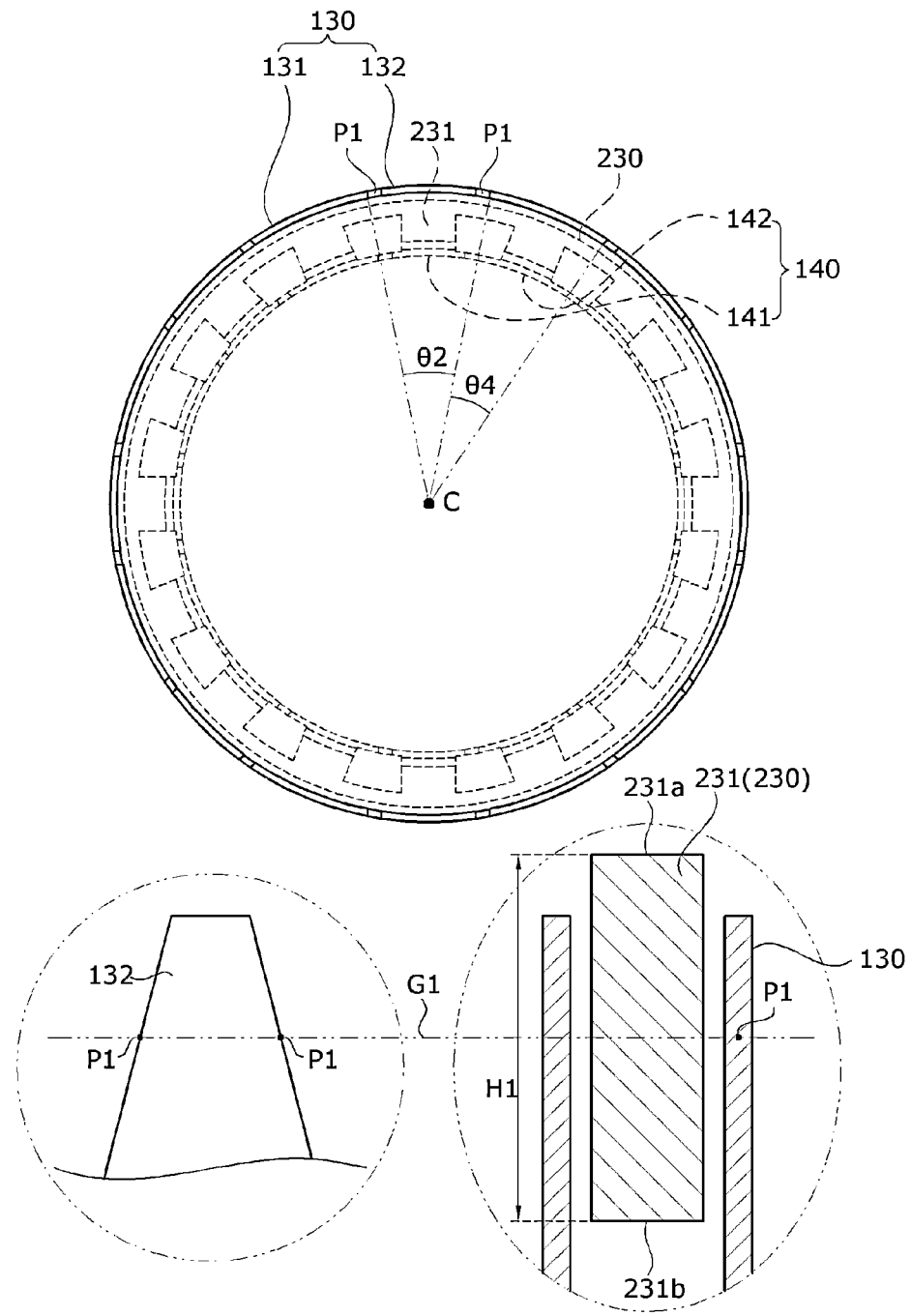

[FIG. 16]
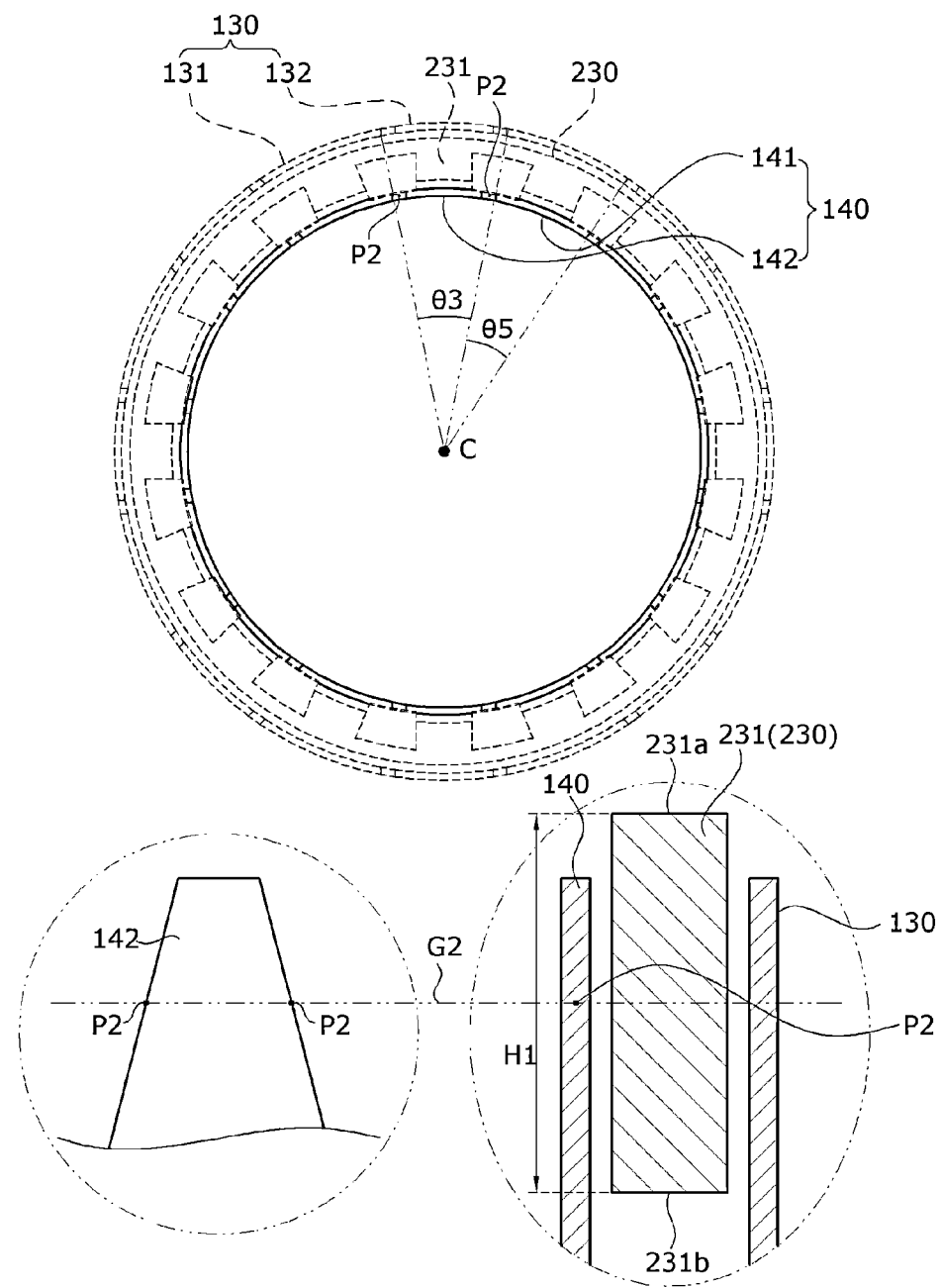

[FIG. 17]
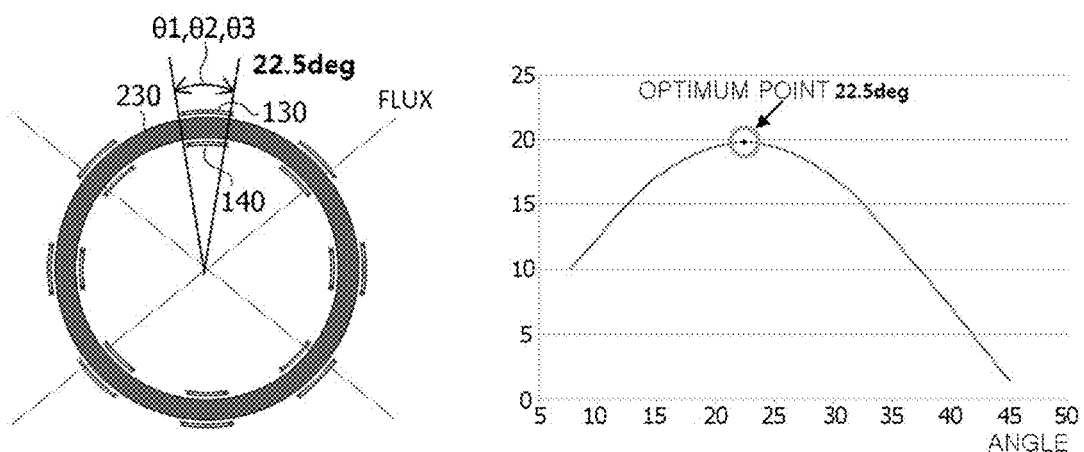

[FIG. 18]
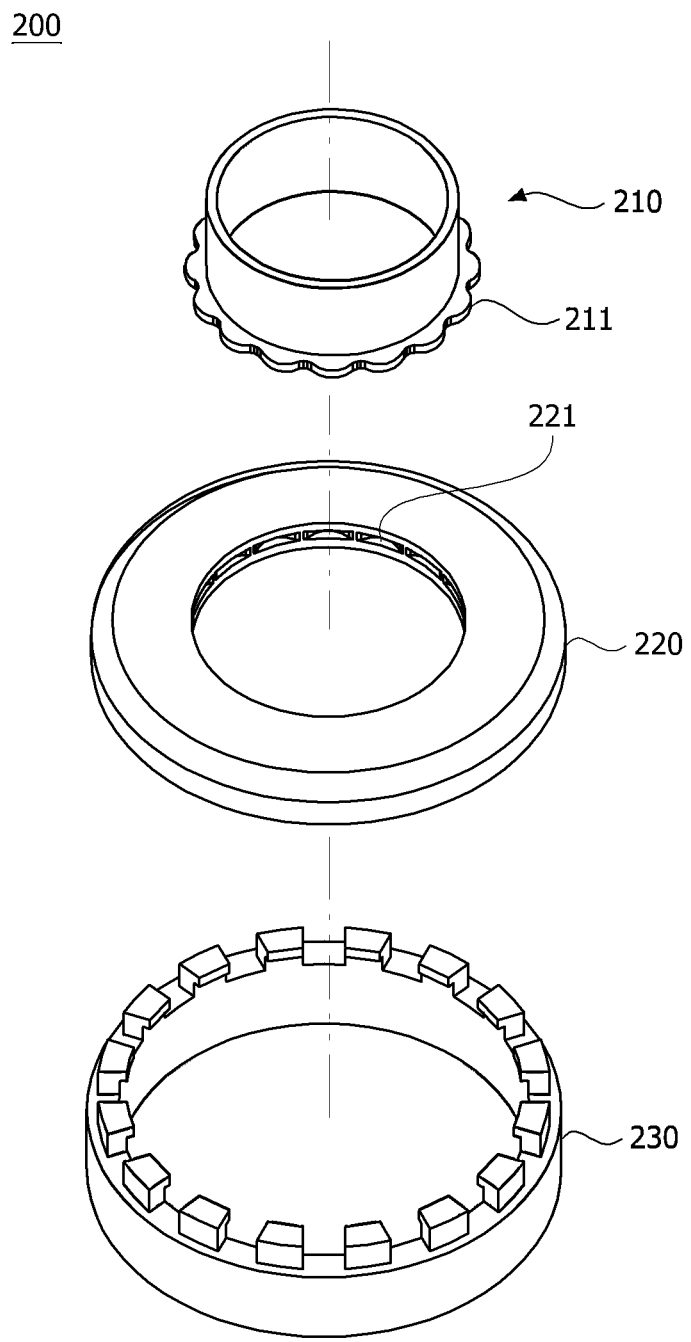

[FIG. 19]
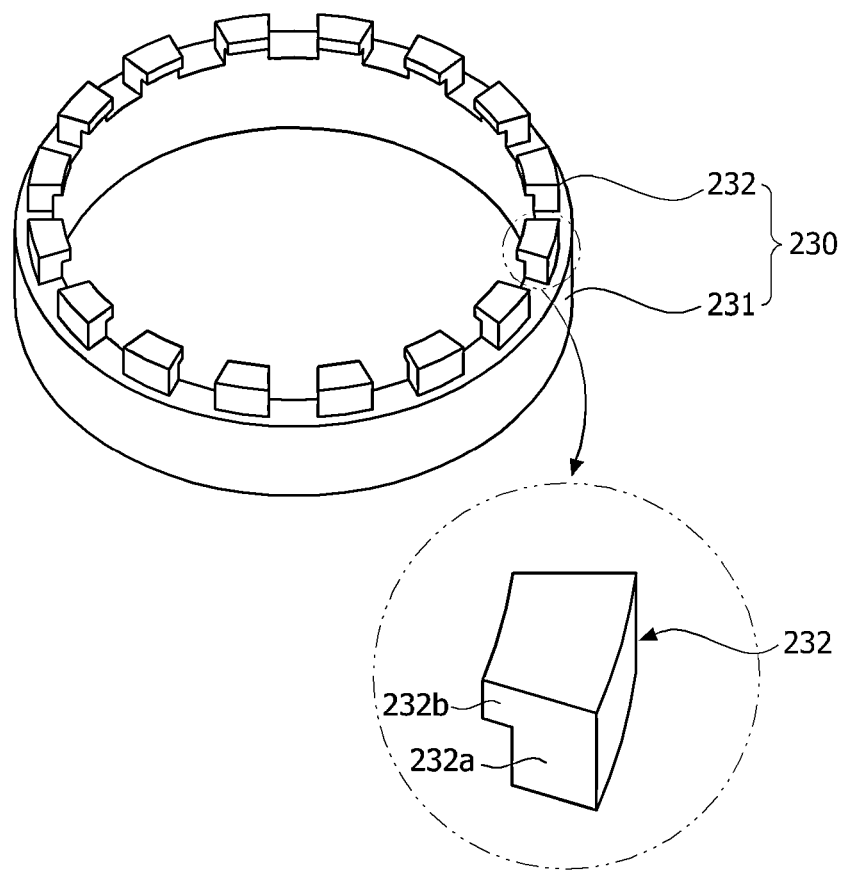

[FIG. 20]
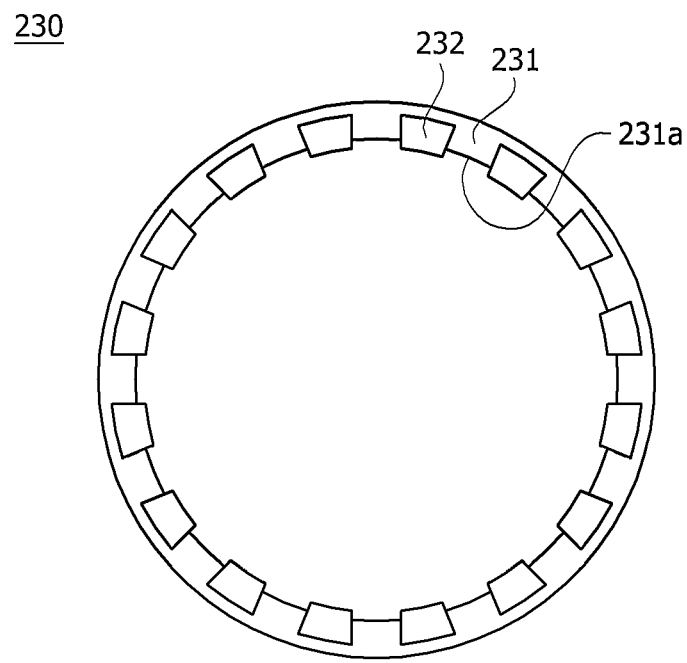

[FIG. 21]
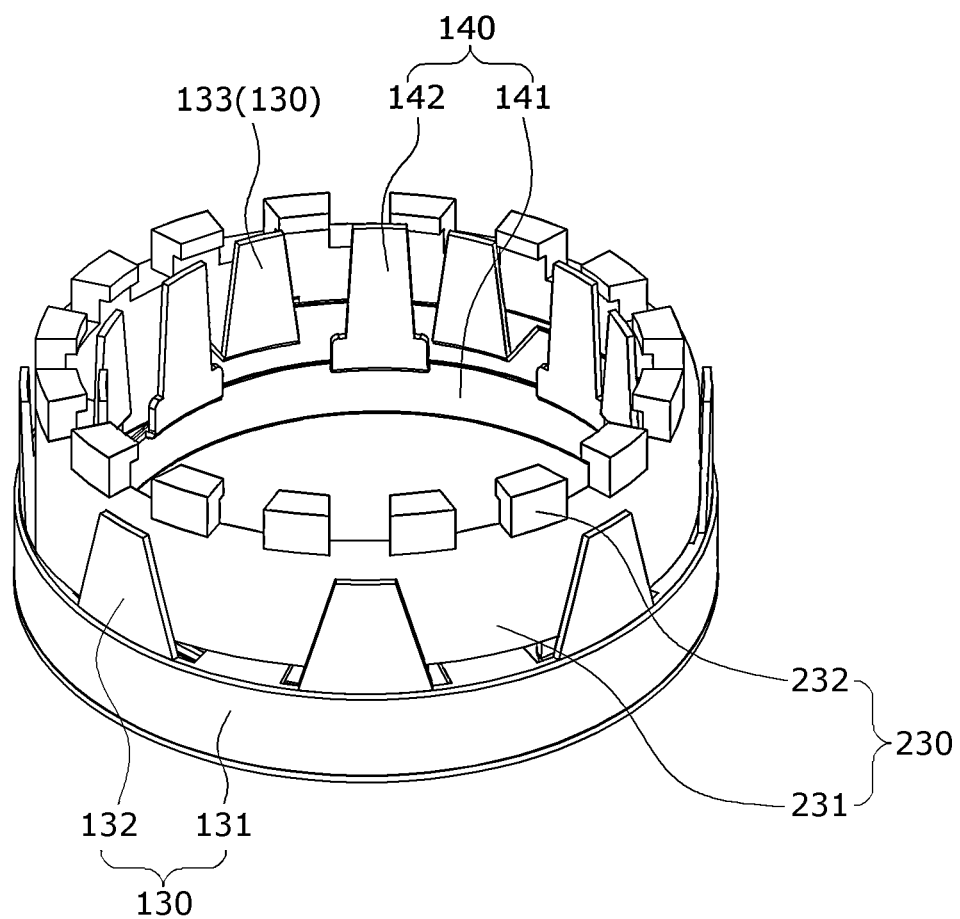

[FIG. 22]
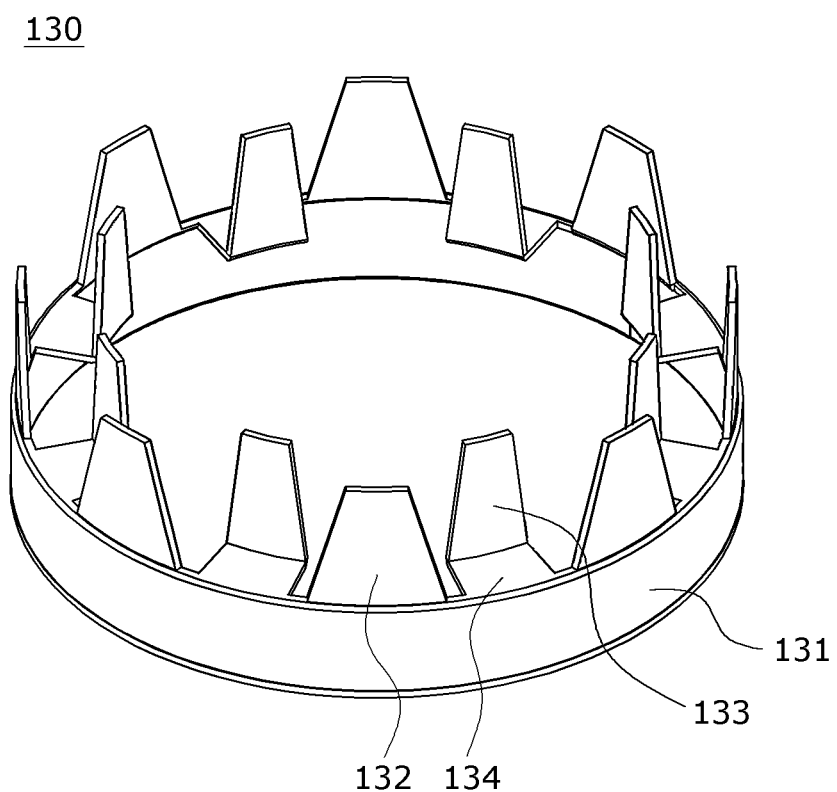

[FIG. 23]
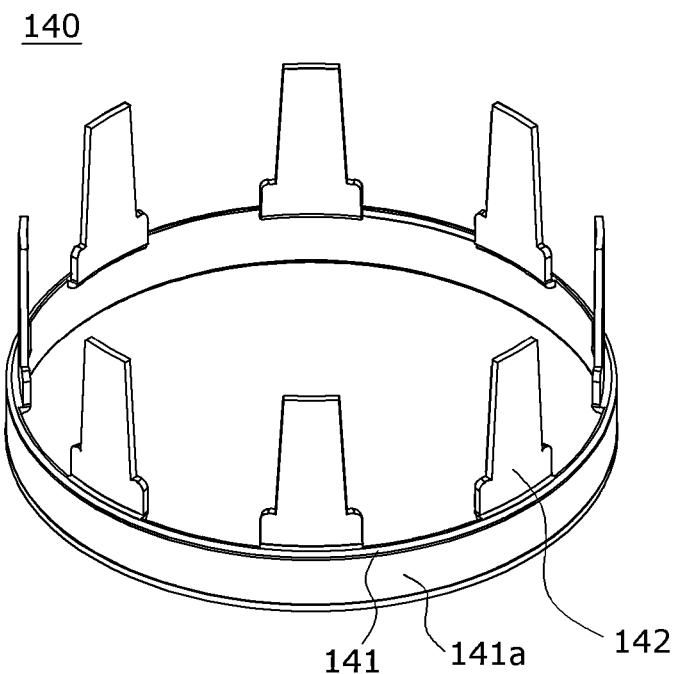

[FIG. 24]
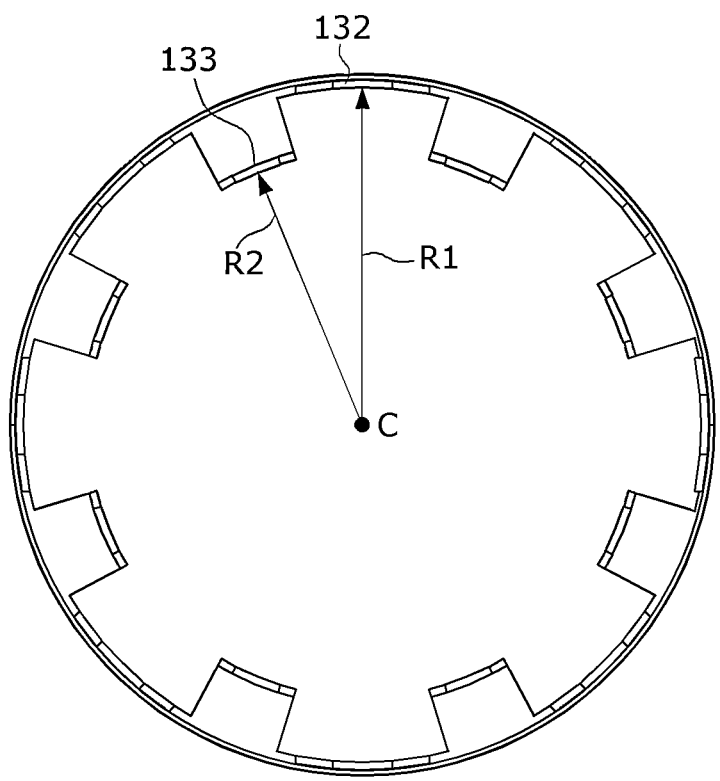

[FIG. 25]
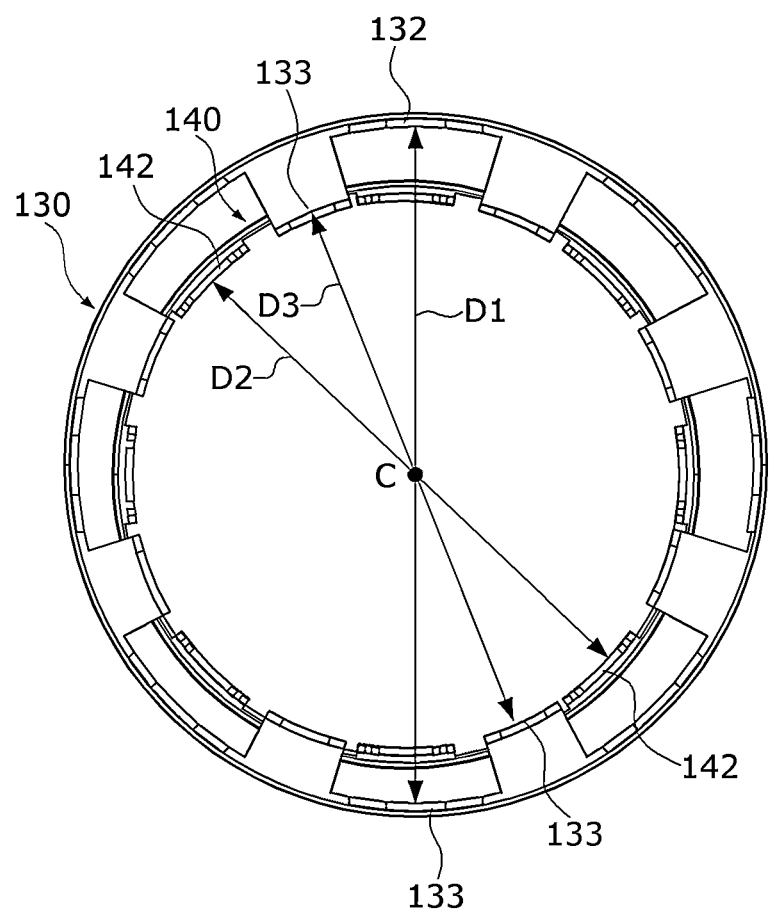

[FIG. 26]
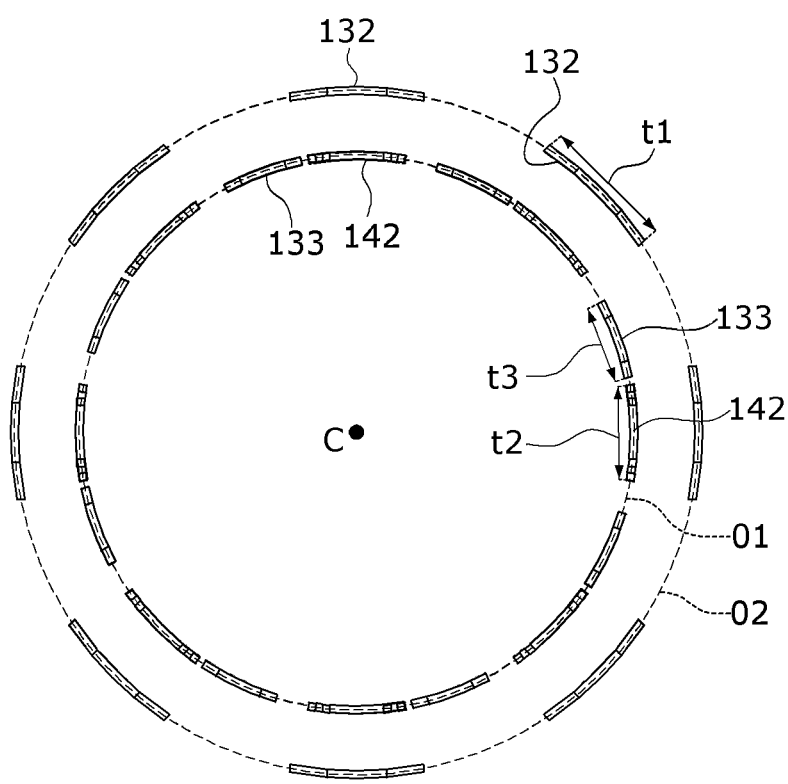

[FIG. 27]
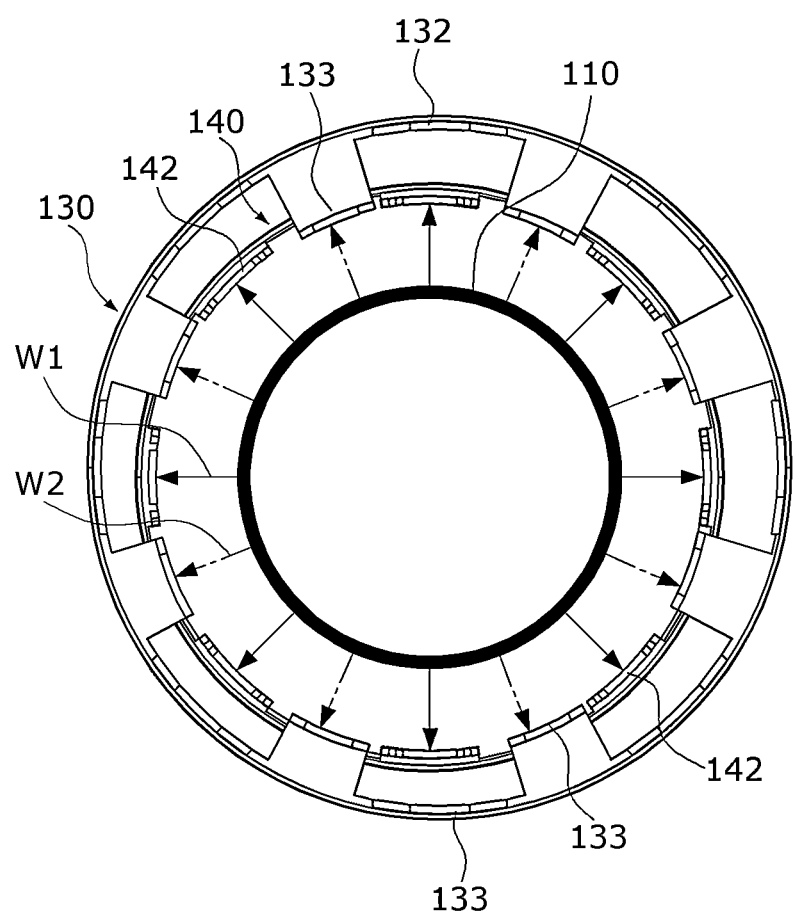

[FIG. 28]
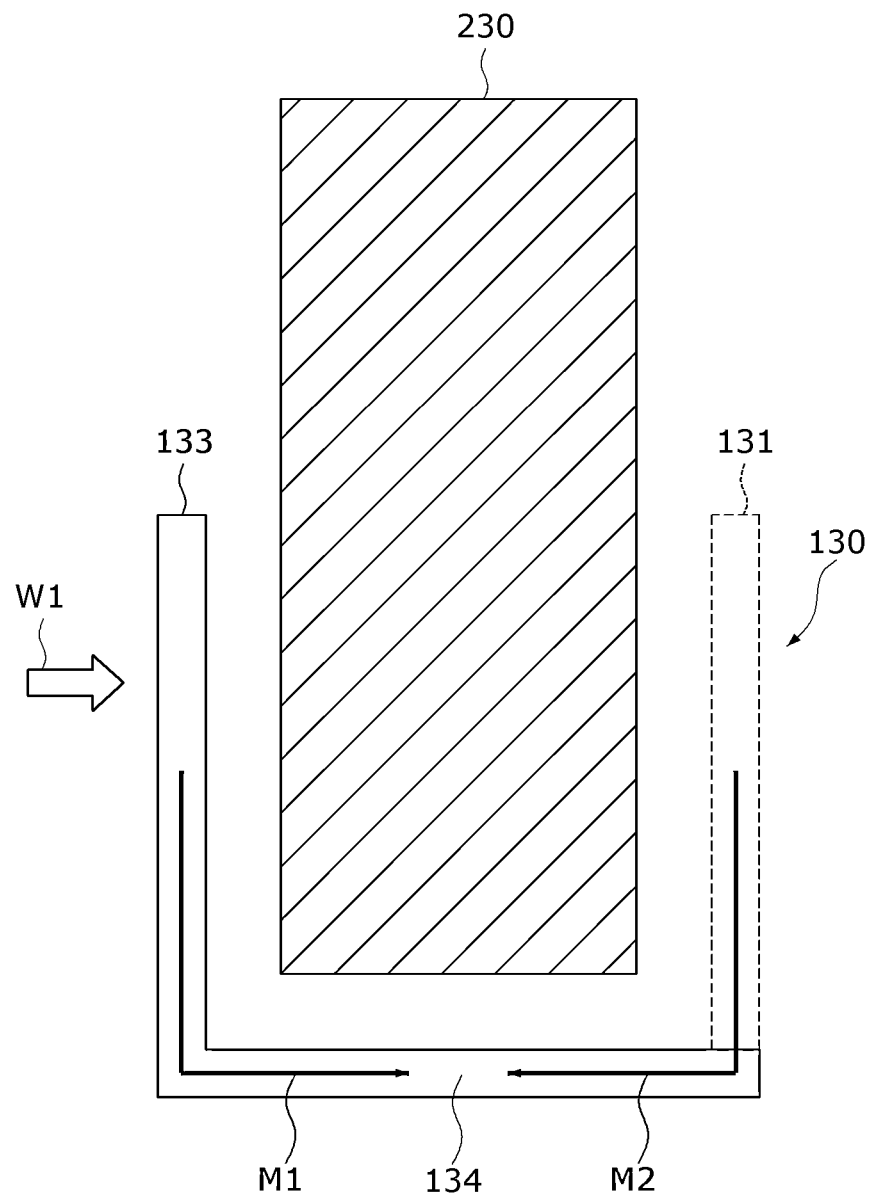

[FIG. 29]
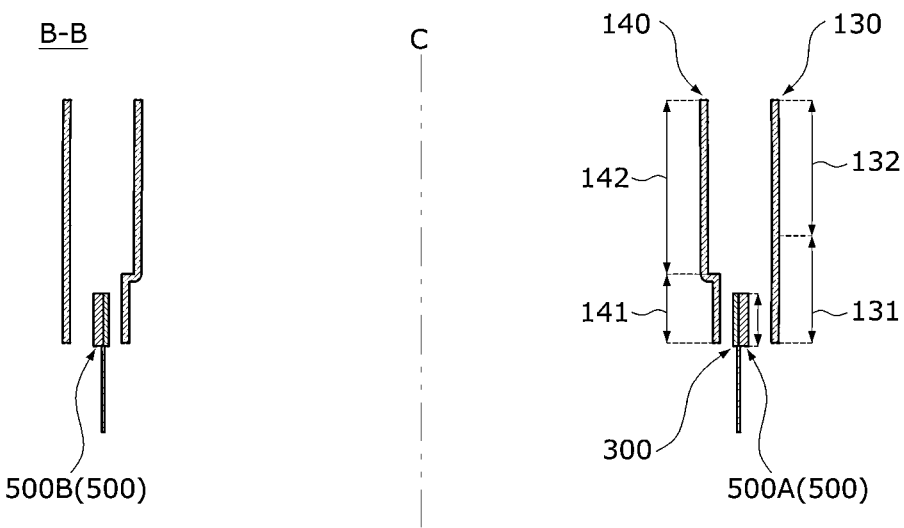

[FIG. 30]
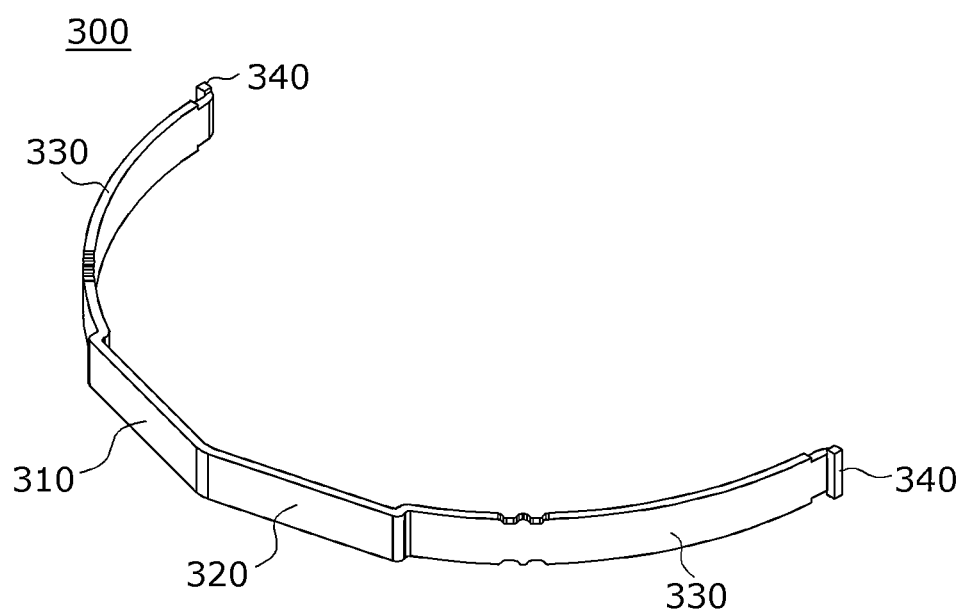

[FIG. 31]
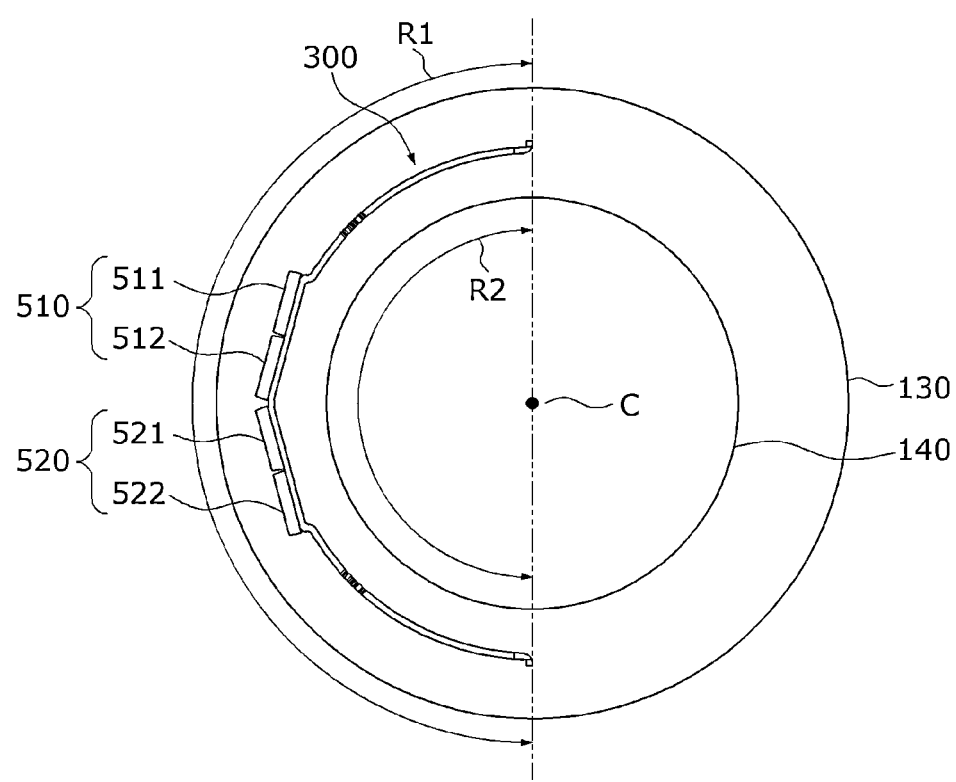

[FIG. 32]
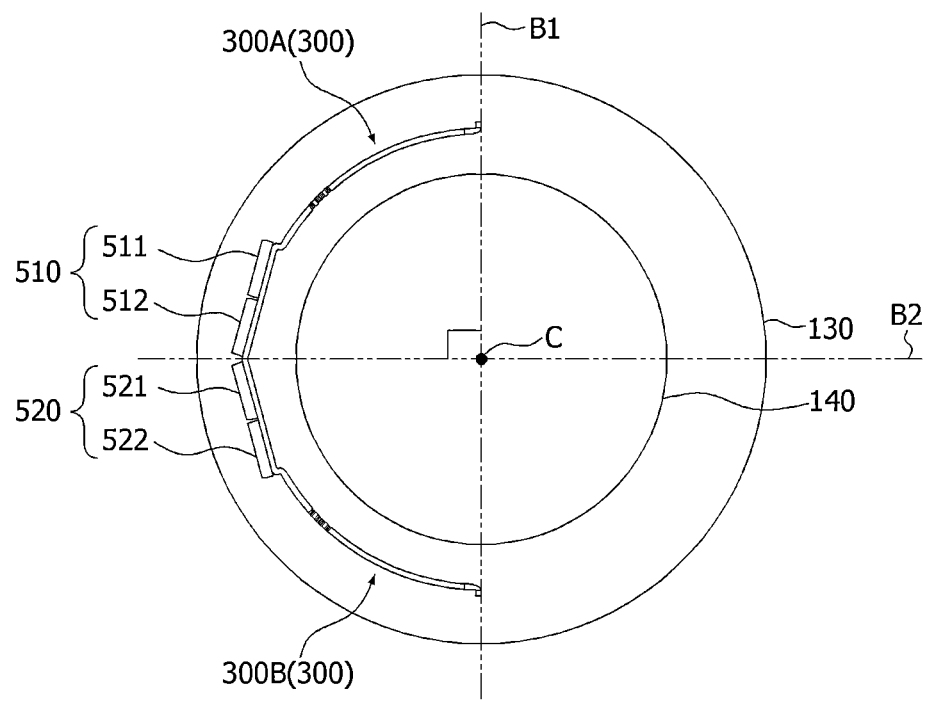

[FIG. 33]
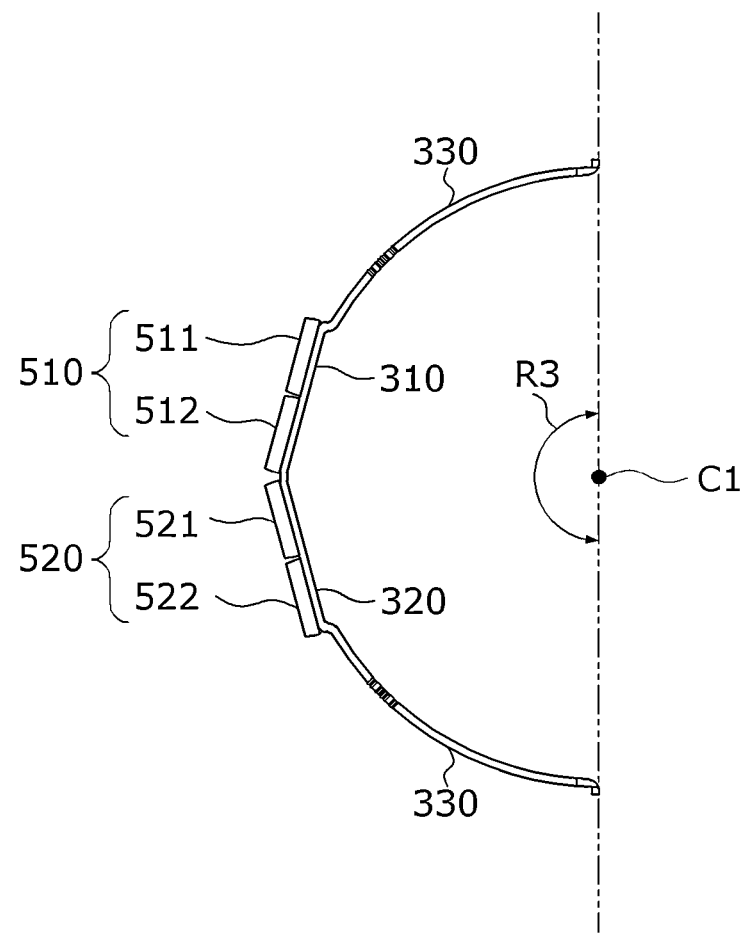

[FIG. 34]
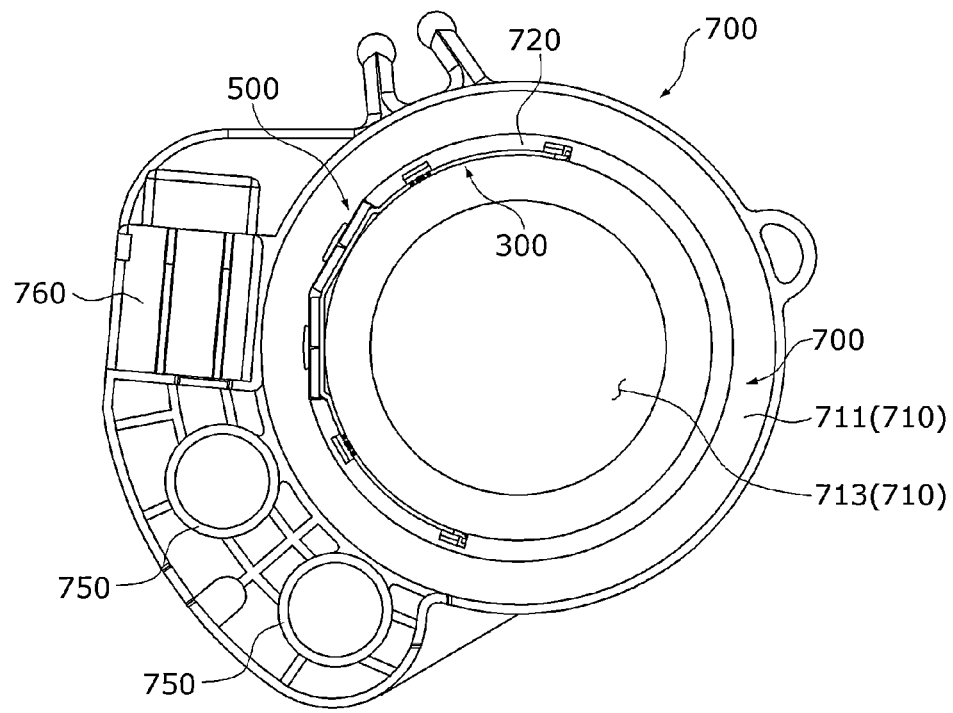

[FIG. 35]
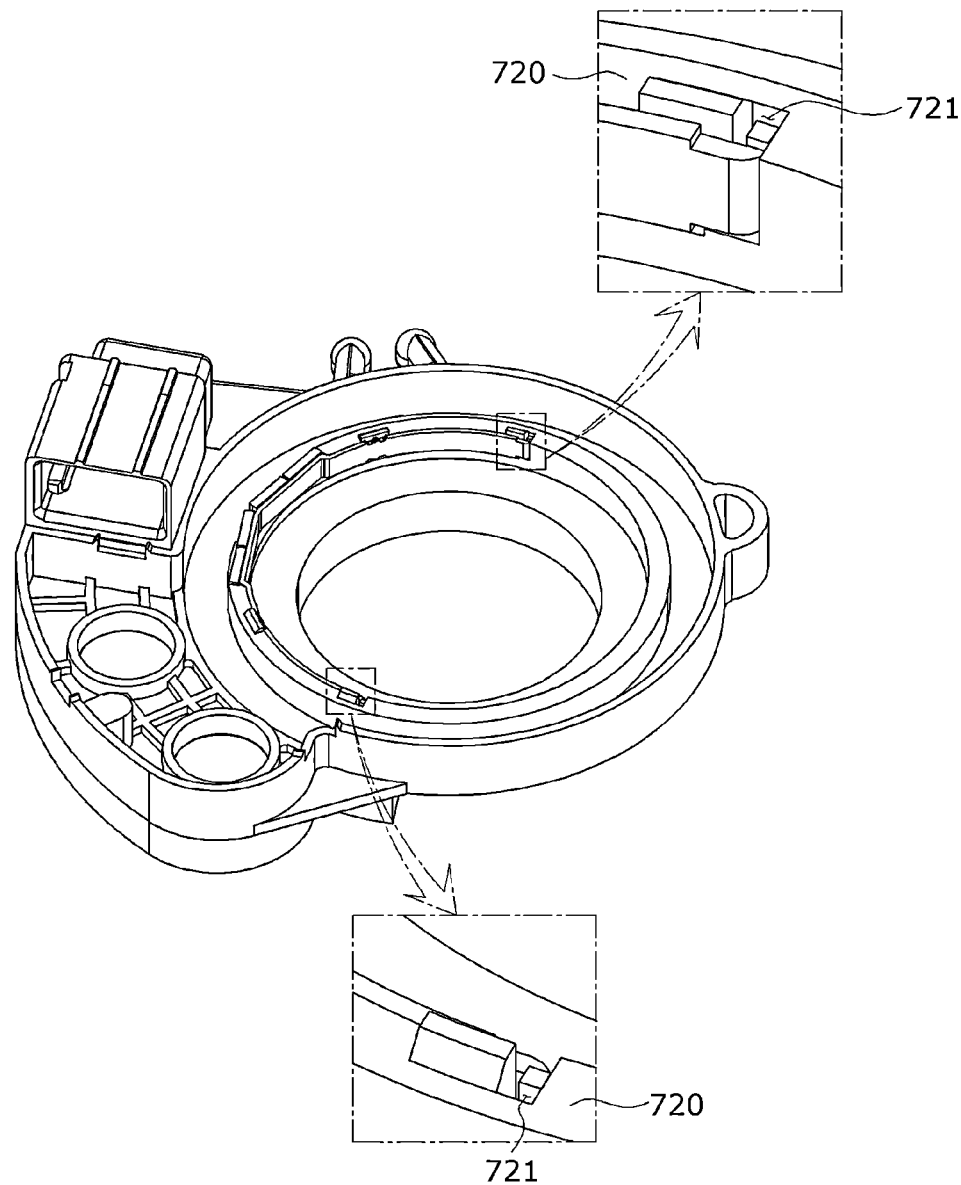

[FIG. 36]
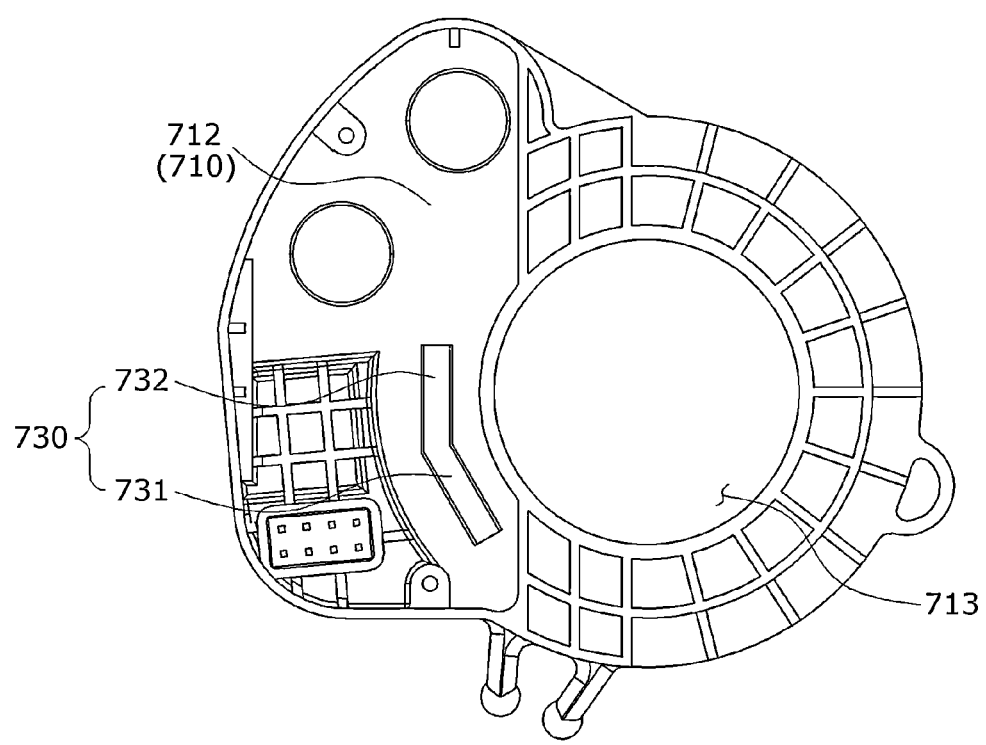

[FIG. 37]
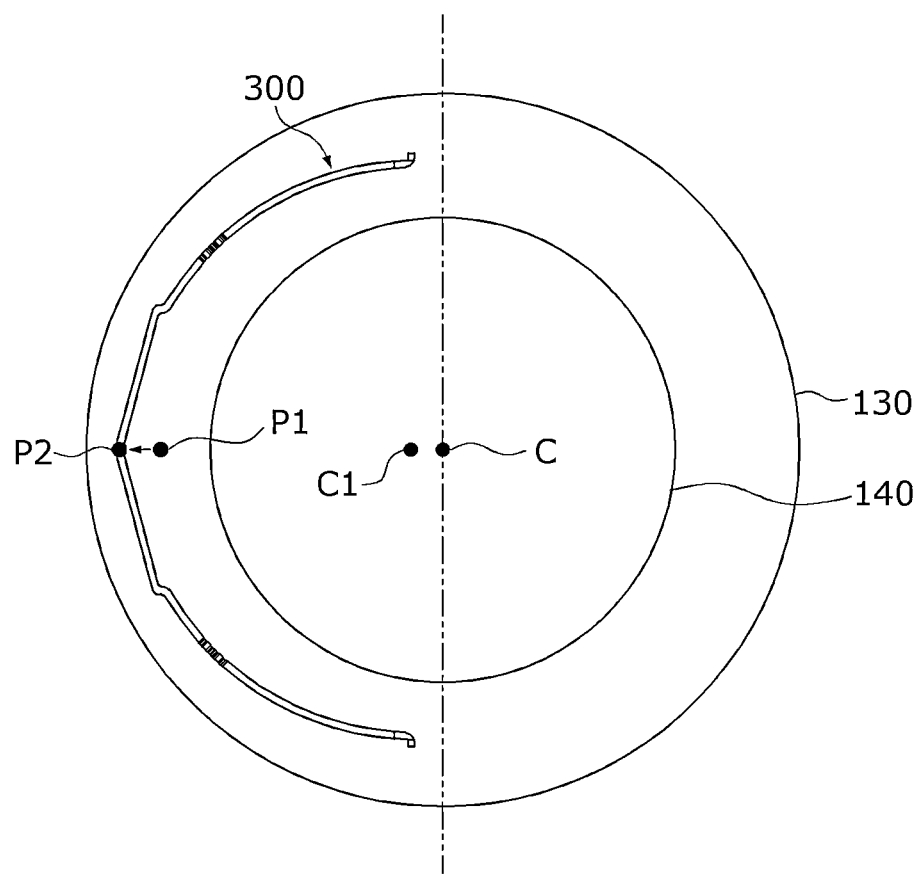

[FIG. 38]
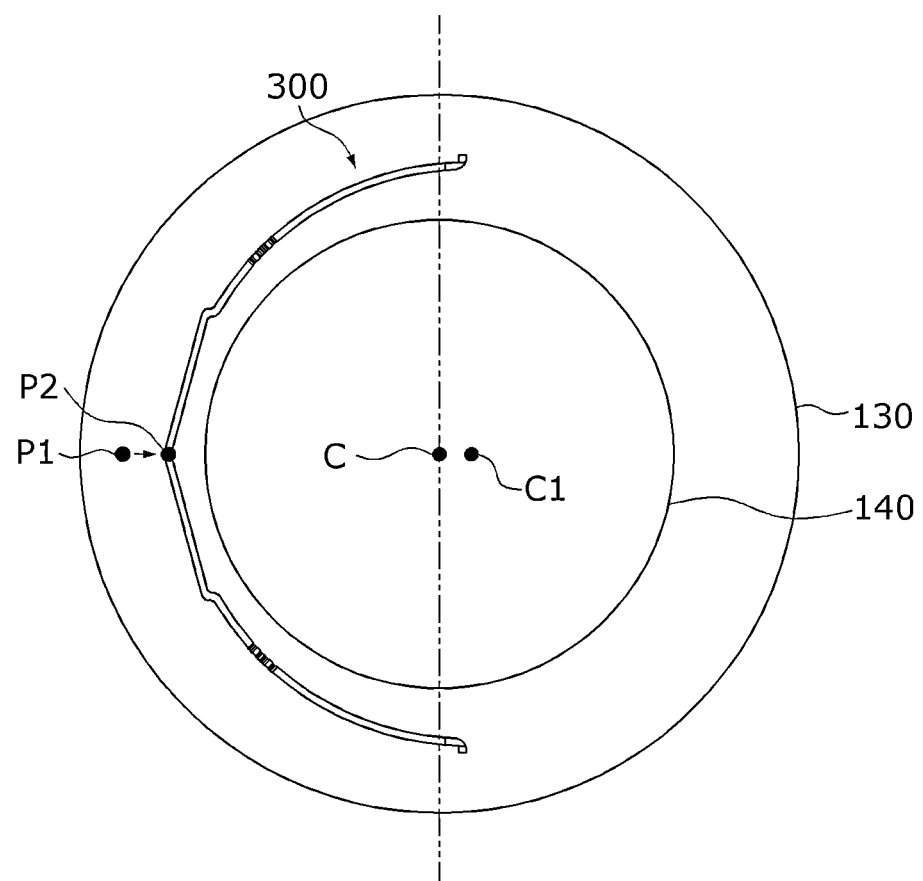

[FIG. 39]
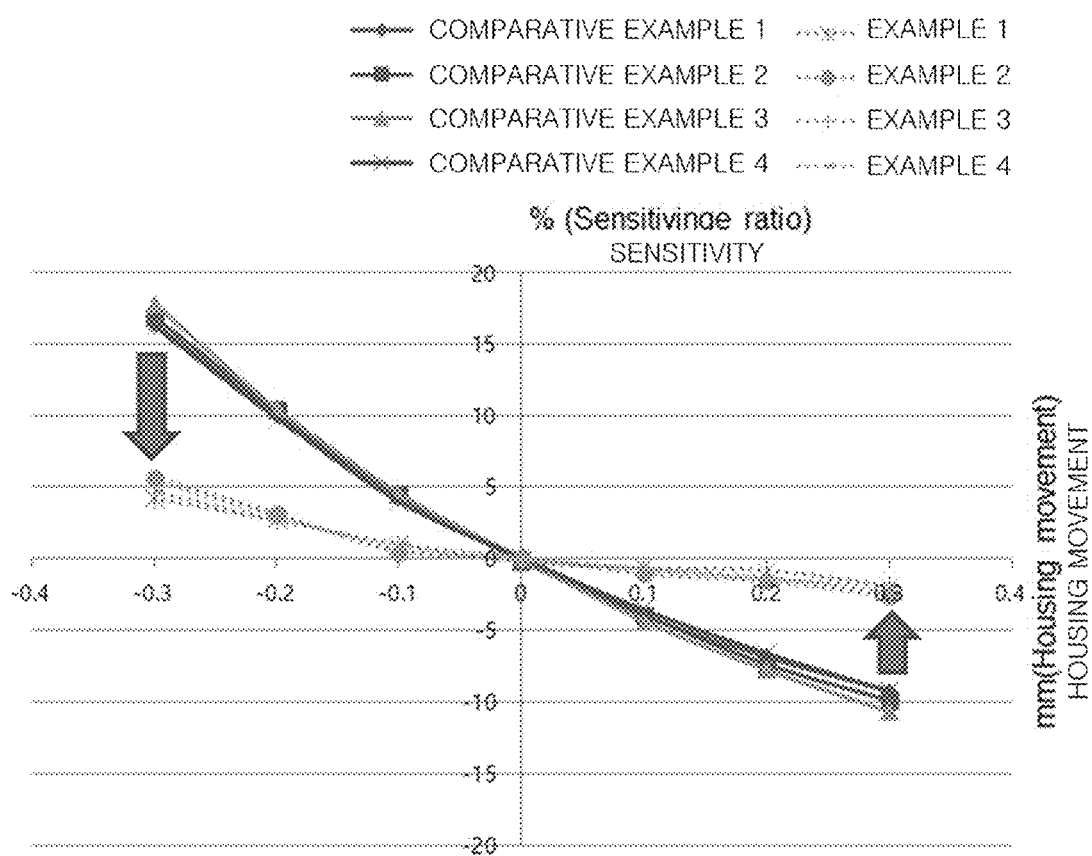

[FIG. 40]
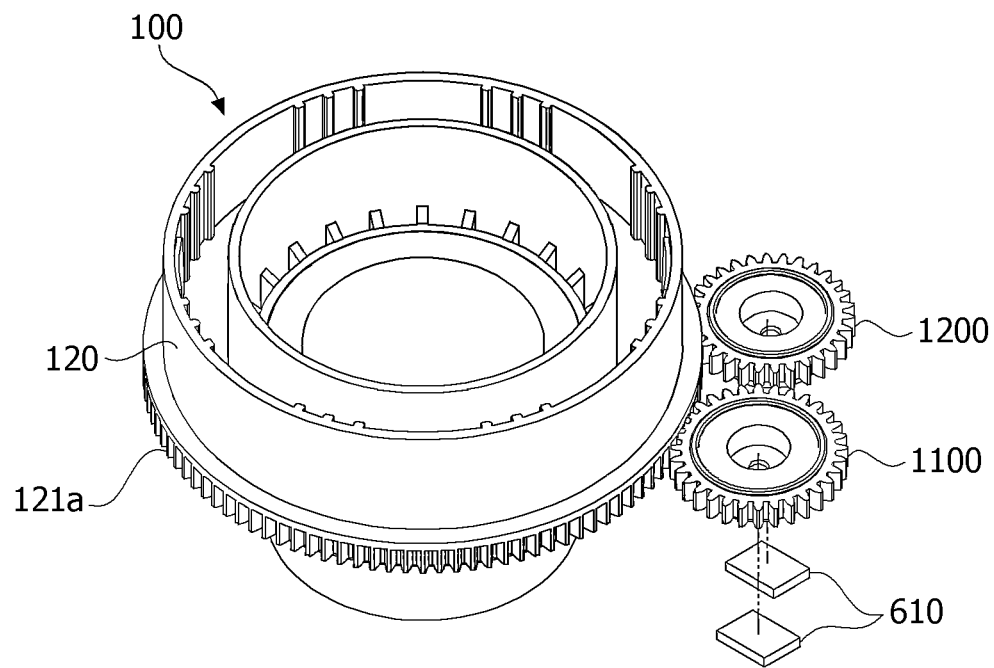

[FIG. 41]
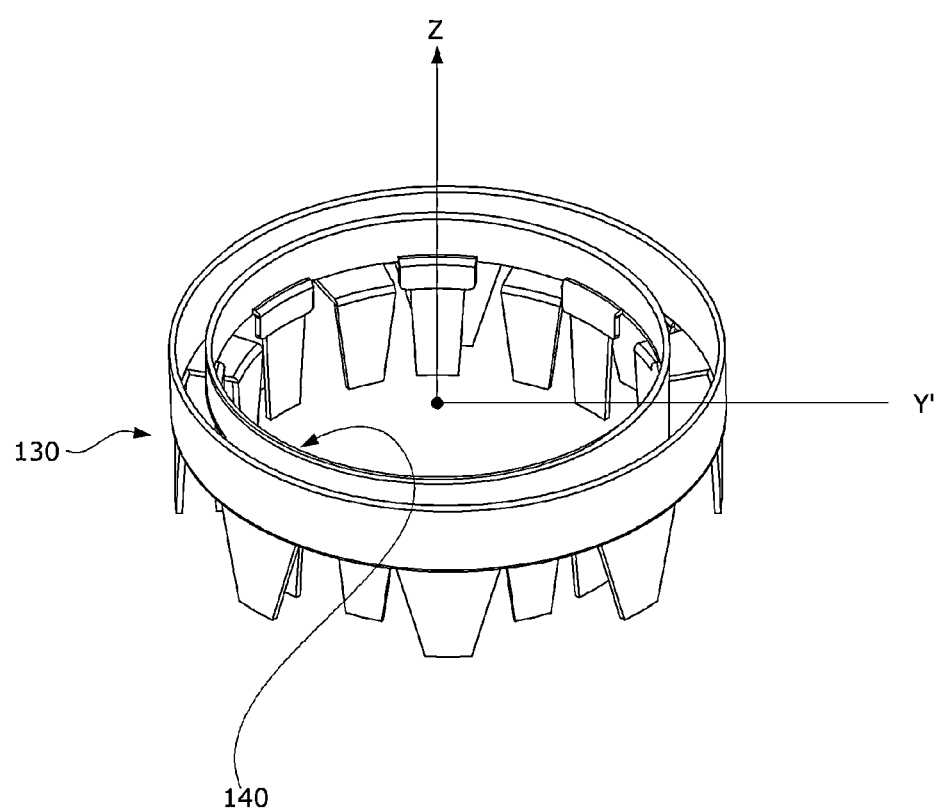

[FIG. 42]
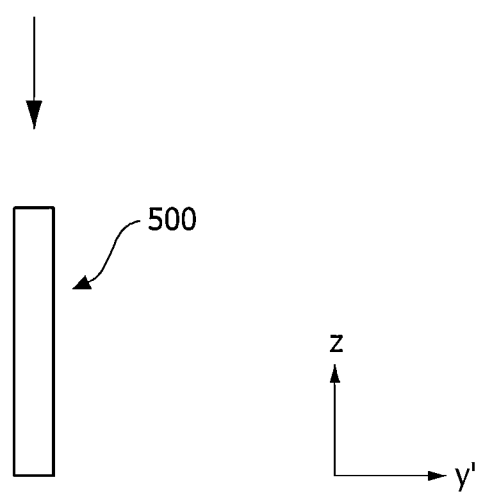

[FIG. 43]
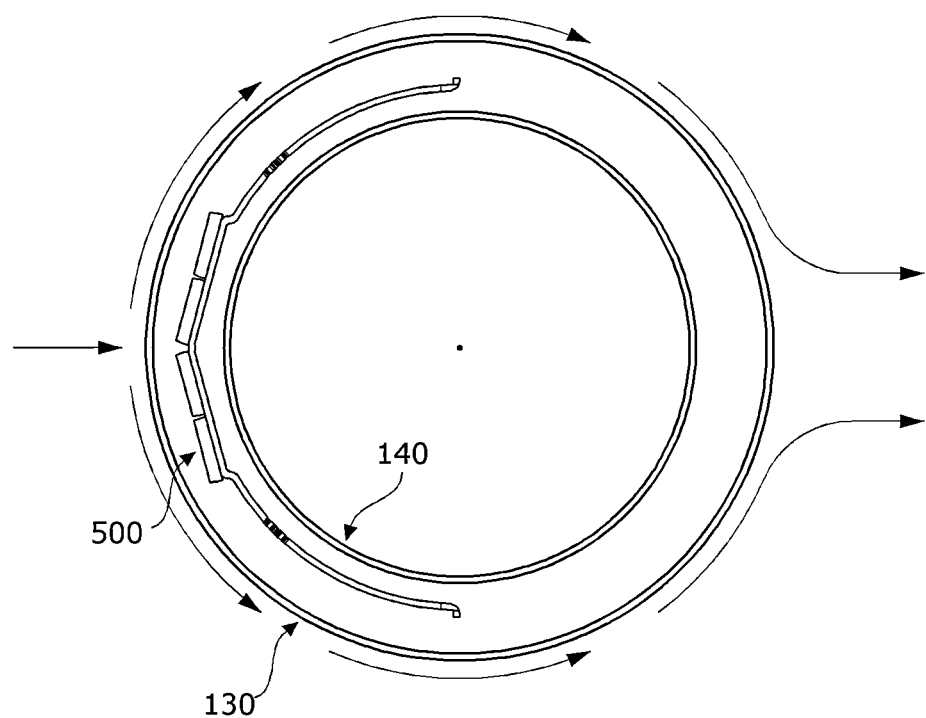

[FIG. 44]
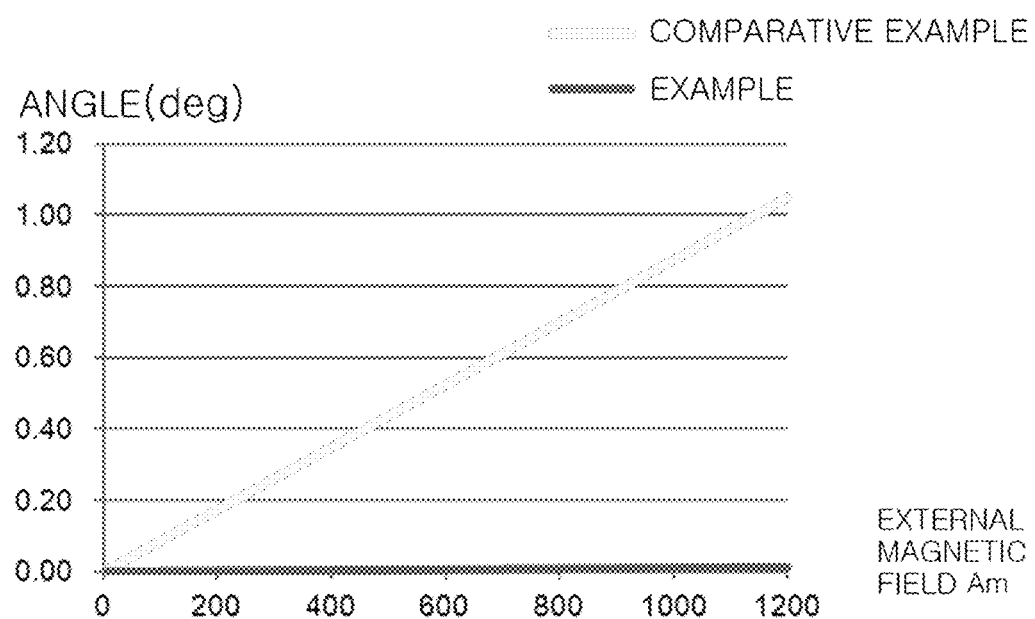

[FIG. 45]
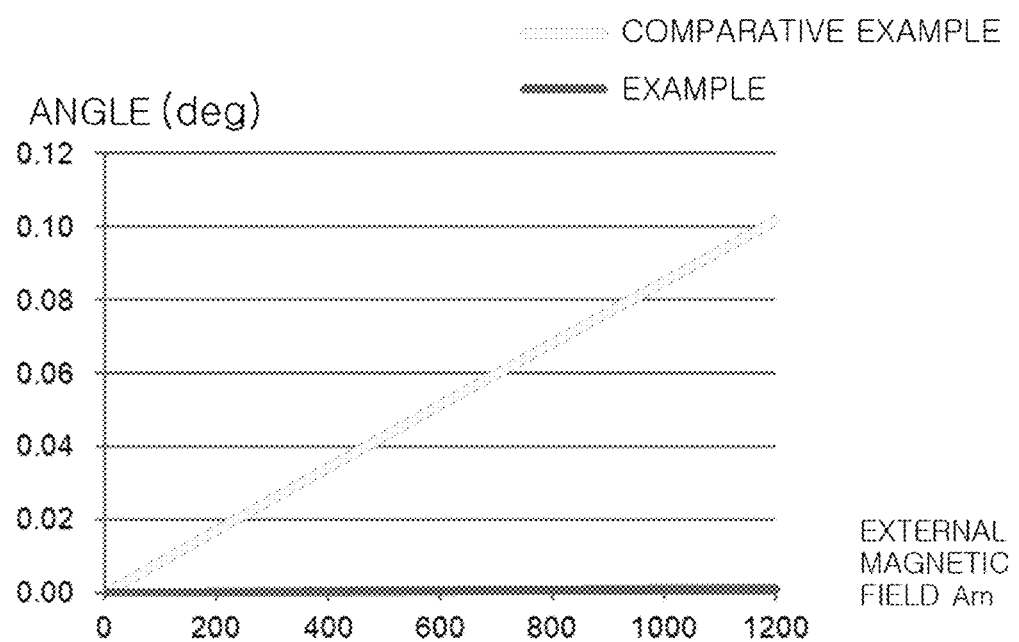

SENSING DEVICE FOR AVOIDING MAGNETIC FIELD INTERFERENCE

CROSS-REFERENCE TO RELATED PATENT APPLICATIONS

This application is a U.S. National Stage Application under 35 U.S.C. § 371 of PCT Application No. PCT/KR2020/006695, filed May 22, 2020, which claims priority to Korean Patent Application No. 10-2019-0059973, filed May 22, 2019, whose entire disclosures are hereby incorporated by reference.

TECHNICAL FIELD

The present invention relates to a sensing device.

BACKGROUND ART

In an electronic power steering (EPS) system, an electronic control unit drives a motor according to driving conditions to secure turning stability and provide a quick reinforcing force so that a driver can stably travel.

An EPS system includes a sensor assembly configured to measure a torque, a steering angle, and the like of a steering shaft to provide a proper torque. The sensor assembly may include a torque sensor configured to measure the torque applied to the steering shaft and an index sensor configured to measure an angular acceleration of the steering shaft. In addition, the steering shaft may include an input shaft connected to a handle, an output shaft connected to a power transmission structure at a side of a wheel, and a torsion bar which connects the input shaft and the output shaft.

The torque sensor measures a torsion degree of the torsion bar to measure the torque applied to the steering shaft. In addition, the index sensor detects rotation of the output shaft to measure the angular acceleration of the steering shaft. In the sensor assembly, the torque sensor and the index sensor may be disposed together to be integrally formed.

The torque sensor may include a stator, which has a housing, a rotor, and a stator tooth, and a collector and measure the torque.

In this case, the torque sensor may have a magnetic type structure in which the collector is disposed outside the stator tooth.

However, when an external magnetic field is generated, since the collector in the structure may serve as a path of the external magnetic field, there is a problem of affecting a flux value of a Hall integrated circuit (IC). Accordingly, since an output value of the torque sensor is changed, there is a problem in that the torsion degree of the torsion bar may not be accurately measured.

Particularly, as more electric devices are used in a vehicle, since the number of cases increases in which a torque sensor is affected by an external magnetic field, a torque sensor, which is not affected by an external magnetic field, is required.

In addition, when the collector has an annular shape and the housing moves, the housing in which the collector is disposed and the stator teeth are eccentrically moved, a length of the collector and a length of the stator tooth are changed in a redial direction, and thus there is a problem of increasing sensitivity to a magnetic flux to be measured.

Technical Problem

The present invention is directed to providing a sensing device which is not affected by a magnetic field interference due to an external magnetic field generated by an external device when a torque is measured.

Particularly, the present invention is directed to providing a sensing device which decreases sensitivity to a magnetic flux to be measured according to movement of a housing.

Objectives that should be solved according to embodiments are not limited to the above-described objectives, and other objectives which are not described above will be clearly understood by those skilled in the art from the following specification.

Technical Solution

One aspect of the present invention provides a sensing device including a stator including a stator tooth and a rotor including a magnet, wherein the stator tooth includes a first stator tooth and a second stator tooth disposed inside the first stator tooth, the first stator tooth includes a plurality of first teeth, the second stator tooth includes a plurality of second teeth, the first tooth overlaps the second tooth in a radial direction from a center of the stator, the sensing device further comprises a sensor and a collector which are disposed between the first stator tooth and the second stator tooth in the radial direction, the first stator tooth includes a first region corresponding to the collector in a circumferential direction, the second stator tooth includes a second region corresponding to the collector in the circumferential direction, and each of a central angle of the first region and a central angle of the second region is 180° or less.

Another aspect of the present invention provides a sensing device including a stator including a stator tooth and a rotor including a magnet, wherein the stator tooth includes a first stator tooth and a second stator tooth disposed inside the first stator tooth, the first stator tooth includes a plurality of first teeth, the second stator tooth includes a plurality of second teeth, the first tooth overlaps the second tooth in a radial direction from a center of the stator, the sensing device further comprises a sensor and a collector which are disposed in a space between the first stator tooth and the second stator tooth in the radial direction, the collector includes a first collector and a second collector, and when a virtual line passing through the center of the stator in the radial direction is defined as a first reference line, and a virtual line perpendicular to the first reference line in the radial direction is defined as a second reference line, the first collector and the second collector are symmetrically disposed with respect to the first reference line at only one side of the second reference line.

Still another aspect of the present invention provides a sensing device including a stator including a stator tooth and a rotor including a magnet, wherein the stator tooth includes a first stator tooth and a second stator tooth disposed inside the first stator tooth, the first stator tooth includes a plurality of first teeth, the second stator tooth includes a plurality of second teeth, the first tooth overlaps the second tooth in a radial direction from a center of the stator, the sensing device further comprises a sensor and a collector which are disposed in a space between the first stator tooth and the second stator tooth in the radial direction, the sensor includes a first sensor and a second sensor, the collector includes a first body disposed opposite to the first sensor, a second body extending from the first body and disposed opposite to the second sensor, and extension parts extending from the first body and the second body, and an angle formed by both ends of the collector based on a curvature center of the extension part is 180° or less.

The sensor may include a first sensor and a second sensor, and the collector may include a first body disposed opposite to the first sensor, a second body extending from the first body and disposed opposite to the second sensor, and extension parts extending from the first body and the second body.

The sensor may include a first sensor and a second sensor, the first collector may include a first body disposed opposite to the first sensor and a first extension part extending from the first body, and the second collector may include a second body disposed opposite to the second sensor and a second extension part extending from the second body.

The first body and the second body may be connected to be bent.

The sensing device may further include a housing configured to accommodate a circuit board, wherein the housing may include a first hole through which the first sensor passes and a second hole through which the second sensor passes, and the first hole and the second hole may be connected to be bent.

The sensing device may further include a housing configured to accommodate a circuit board, wherein the collector may include bent parts disposed at both ends to be bent outward, and the housing may include grooves in which the bent parts are disposed.

The housing may include a protrusion having an annular shape protruding in an axial direction, and the grooves may be concavely disposed in an inner circumferential surface of the protrusion.

The sensor may be disposed between the collector and the first stator tooth in the radial direction.

Advantageous Effects

A sensing device according to an embodiment having a structure described above has an advantage of decreasing sensitivity to a magnetic flux to be measured even when a collector moves.

In addition, since the collector is disposed between a pair of stator teeth and a sensor is disposed between collectors, a magnetic field interference due to an external magnetic field generated by an external device when a torque is measured can be prevented or minimized.

In addition, since a first tooth of a first stator tooth and a second tooth of a second stator tooth, which are disposed to be spaced apart from each other in a radial direction, are disposed to overlap, and a magnet is rotated between the first tooth and the second tooth, the first tooth and the second tooth may be charged to different poles.

In addition, there is an advantage of increasing a magnitude of a flux being collected.

In addition, a magnetic field interference due to an external magnetic field introduced from an inner side of a stator holder can be prevented or minimized.

In addition, a magnetic field interference due to an external magnetic field introduced from a side surface of the sensing device can be prevented or minimized.

Useful advantages and effects of the embodiments are not limited to the above-described contents and will be more easily understood from descriptions of the specific embodiments.

DESCRIPTION OF DRAWINGS

FIG. 1 is a perspective view illustrating a sensing device according to an embodiment.

FIG. 2 is an exploded perspective view illustrating the sensing device illustrated in FIG. 1.

FIG. 3 is a cross-sectional perspective view of the sensing device taken along line A-A of FIG. 1.

FIG. 4 is a perspective view illustrating a stator of the sensing device according to the embodiment.

FIG. 5 is an exploded perspective view illustrating the stator of the sensing device according to the embodiment.

FIG. 6 is a cross-sectional view illustrating the stator of the sensing device according to the embodiment.

FIG. 7 is a perspective view illustrating a stator body of the stator.

FIG. 8 is a plan view illustrating the stator body of the stator.

FIGS. 9 and 10 are cross-sectional views illustrating the stator body of the stator.

FIG. 11 is a side view illustrating a first stator tooth.

FIG. 12 is a side view illustrating a second stator tooth.

FIG. 13 is a plan view illustrating the first stator tooth, the second stator tooth, and a magnet.

FIG. 14 is a view illustrating a first pole and a second pole of the magnet.

FIG. 15 is a view illustrating a second angle ($\Theta 2$).

FIG. 16 is a view illustrating a third angle ($\Theta 3$).

FIG. 17 is a graph showing a flux versus a first angle ($\Theta 1$), the second angle ($\Theta 2$), and the third angle ($\Theta 3$).

FIG. 18 is an exploded perspective view illustrating a rotor.

FIG. 19 is a view illustrating the magnet.

FIG. 20 is a plan view illustrating the magnet.

FIG. 21 is a perspective view illustrating an arrangement of the magnet with respect to the first stator tooth and the second stator tooth.

FIG. 22 is a perspective view illustrating the first stator tooth.

FIG. 23 is a perspective view illustrating the second stator tooth.

FIG. 24 is a plan view illustrating the first stator tooth.

FIG. 25 is a plan view illustrating the first stator tooth and the second stator tooth.

FIG. 26 is a view illustrating the first tooth, the second tooth, and a third tooth which are concentrically disposed.

FIG. 27 is a plan view which illustrates a flow of an external magnetic field introduced from an inner side of a stator holder and illustrates the first stator tooth and the second stator tooth.

FIG. 28 is a cross-sectional view which illustrates a flow of the external magnetic field guided to the third tooth and illustrates the first stator tooth.

FIG. 29 shows side cross-sectional views illustrating the first stator tooth, the second stator tooth, a sensor, and a collector.

FIG. 30 is a view illustrating the collector.

FIG. 31 is a view illustrating the collector disposed between the first stator tooth and the second stator tooth, wherein a first region of the first stator tooth and a second region of the second stator tooth are illustrated.

FIG. 32 is a view illustrating the collector disposed between the first stator tooth and the second stator tooth, wherein a position of the collector with respect to a first reference line and a second reference line is illustrated.

FIG. 33 is a view illustrating a shape of the collector with respect to a curvature center of an extension part of the collector of FIG. 32.

FIG. 34 is a view illustrating a housing in which the collector and the sensor are disposed.

FIG. 35 is a view illustrating a groove in a protrusion disposed in the housing illustrated in FIG. 34.

FIG. 36 is a bottom view illustrating the housing illustrated in FIG. 34.

FIG. 37 is a view illustrating a relative position of the collector with respect to the first stator tooth and the second stator tooth when the collector moves to any one side.

FIG. 38 is a view illustrating a relative position of the collector with respect to the first stator tooth and the second stator tooth when the collector moves to the other side.

FIG. 39 is a comparison graph of sensitivity to a magnetic flux measured by the sensing device according to Example and a sensing device according to Comparative example.

FIG. 40 is a view illustrating a first gear and a second gear which are engaged with a main gear.

FIG. 41 is a view illustrating a direction of an external magnetic field with respect to the stator tooth.

FIG. 42 is a view illustrating an avoidance state of the sensor from an external magnetic field having a z-axis direction.

FIG. 43 is a view illustrating an avoidance state of the first and second stator teeth from an external magnetic field having a y'-axis direction.

FIG. 44 is a comparison graph of an amount of a change in angle according to an external magnetic field in a z-axis direction between Comparative example and Example.

FIG. 45 is a comparison graph of an amount of a change in angle according to an external magnetic field in a y'-axis direction between Comparative example and Example.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

FIG. 1 is a perspective view illustrating a sensing device according to an embodiment, FIG. 2 is an exploded perspective view illustrating the sensing device illustrated in FIG. 1, and FIG. 3 is a cross-sectional perspective view of the sensing device taken along line A-A of FIG. 1. In FIGS. 1 and 2, a z direction means an axial direction, and a y direction means a radial direction. In addition, the axial direction and the radial direction are perpendicular to each other.

Referring to FIGS. 1 to 3, a sensing device 1 according to the embodiment may include a stator 100, a rotor 200 of which a part is disposed inside the stator 100, a sensor 500, a circuit board 600 electrically connected to the sensor 500, a housing 700 to which the circuit board 600 is coupled, a first member 800, and a second member 900.

In this case, the stator 100 may be connected to an output shaft (not shown), and the rotor 200 of which at least the part is disposed inside the stator 100 may be connected to an input shaft (not shown), but the present invention is not necessarily limited thereto.

In this case, the rotor 200 may be rotatably disposed with respect to the stator 100. Hereinafter, "inside" means a direction toward a center C in the radial direction, and "outside" means a direction opposite to "inside."

FIG. 4 is a perspective view illustrating the stator of the sensing device according to the embodiment, FIG. 5 is an exploded perspective view illustrating the stator of the sensing device according to the embodiment, and FIG. 6 is a cross-sectional view illustrating the stator of the sensing device according to the embodiment.

The stator 100 may be connected to an output shaft (not shown) of a steering shaft.

Referring to FIGS. 4 to 6, the stator 100 may include a stator holder 110, a stator body 120, a first stator tooth 130, and a second stator tooth 140.

The stator holder 110 may be connected to an output shaft of an electric steering apparatus. Accordingly, the stator holder 110 may be rotated in conjunction with rotation of the output shaft. The stator holder 110 may be formed in a cylindrical shape. In addition, the stator holder 110 may be formed of a metal material but is not necessarily limited thereto, and the stator holder 110 may be formed of another material by considering a predetermined strength or more so that the output shaft is fixedly inserted thereinto.

The stator holder 110 may include a groove 111. The groove 111 is concavely formed in an outer circumferential surface of the stator holder 110. The groove 111 is disposed along the outer circumferential surface of the stator holder 110. A fixing member 900 (see FIG. 2) is inserted into the groove 111.

The stator holder 110 may be coupled to the stator body 120.

The stator body 120 may be disposed on one end portion of the stator holder 110. The stator body 120 may be coupled to the stator holder 110 in an insertion-injection molding manner using a synthetic resin such as a resin. A main gear 121 may be formed on an outer circumferential surface of the stator body 120. The main gear 121 transmits a rotational force of the stator body 120 to a first gear 1100 (see FIG. 40) and a second gear 1200 (see FIG. 40).

The first stator tooth 130 and the second stator tooth 140 may be disposed to be spaced apart from each other in the radial direction. In addition, the first stator tooth 130 and the second stator tooth 140 may be fixed to the stator body 120. The first stator tooth 130 includes a first body 131, first teeth 132, and third teeth 133. The second stator tooth 140 includes a second body 141 and second teeth 142.

FIG. 7 is a perspective view illustrating the stator body of the stator, FIG. 8 is a plan view illustrating the stator body of the stator, and FIGS. 9 and 10 are cross-sectional views illustrating the stator body of the stator.

Referring to FIGS. 7 to 10, the stator body 120 includes an inner part 121, an outer part 122, and a partition plate 123. The inner part 121 and the outer part 122 have cylindrical shapes. The outer part 122 is disposed to be spaced outward from the inner part 121 in the radial direction. The partition plate 123 connects the inner part 121 and the outer part 122. The inner part 121, the outer part 122, and the partition plate 123 may be an integrated part. The stator holder 110 may be coupled to an inner side of the inner part 121. A space S may be formed between the outer part 122 and the inner part 121. The partition plate 123 may be formed in a plate shape. The partition plate 123 may be disposed between the inner part 121 and the outer part 122.

The space S may be divided into a first space S1 and a second space S2 by the partition plate 123. The sensor 500 may be disposed in the first space S1, and a magnet 230 may be disposed in the second space S2. The partition plate 123 may be disposed at a lower level than a virtual horizontal line L1. In this case, the virtual horizontal line L1 passes through a center of the outer part 122 in the axial direction.

Meanwhile, the partition plate 123 may include a first hole 124 and a second hole 125. The first hole 124 and the second hole 125 are for arranging the first stator tooth 130 and the second stator tooth 140.

The first body 131 and the second body 141 may be disposed in the first space S1, and the first tooth 132 and the second tooth 142 may be disposed in the second space S2.

The first hole 124 may be formed as a plurality of first holes 124 spaced apart from each other in a circumferential direction. In addition, the first tooth 132 is disposed in the second space S2 to pass through the first hole 124. In this case, the number of the first holes 124 is the same as the number of the first teeth 132. The first hole 124 may be disposed close to an inner circumferential surface of the outer part 122. As illustrated in FIG. 8, the first hole 124 may be formed in the partition plate 123 to be in contact with the inner circumferential surface of the outer part 122.

The second hole 125 may be formed as a plurality of second holes 125 spaced apart from each other in a circumferential direction. In this case, the second hole 125 may be disposed to be space inward from the first hole 124 in the radial direction. In addition, the second tooth 142 is disposed in the second space S2 to pass through the second hole 125.

In this case, the number of the second holes 125 is the same as the number of the second teeth 142 of the second stator tooth 140. The second hole 125 may be disposed close to an outer circumferential surface of the inner part 121. As illustrated in FIG. 8, the second hole 125 may be formed in the partition plate 123 to be in contact with the outer circumferential surface of the inner part 121.

A plurality of third holes 127 may be formed to be spaced apart from each other in the circumferential direction. The third hole 127 may be disposed between the second hole 125 and the second hole 125 in the circumferential direction. The third tooth 133 is disposed in the second space S2 to pass through the third hole 127. In this case, the number of the third holes 127 may be the same as the number of the third teeth 133 of the first stator tooth 130. The third hole 127 may be disposed close to the outer circumferential surface of the inner part 121. The third hole 127 may be formed in the partition plate 123 to be in contact with the outer circumferential surface of the inner part 121.

The first stator tooth 130 and the second stator tooth 140 may be disposed between the outer circumferential surface of the inner part 121 and the inner circumferential surface of the outer part 122 of the stator body 120. In this case, the first stator tooth 130 and the second stator tooth 140 may be formed of metal materials to be electrically charged by rotation of the magnet 230.

In addition, the first stator tooth 130 may be fixed to the inner circumferential surface of the outer part 122 by an adhesive member (not shown) such as glue, and the second stator tooth 140 may be fixed to the outer circumferential surface of the inner part 121 by an adhesive member (not shown) such as glue, but the present invention is not necessarily limited thereto. For example, the first stator tooth 130 and the second stator tooth 140 may be fixed to the stator body 120 by a coupling member (not shown) or in a caulking manner.

A boss 126 is disposed to extend downward from the partition plate 123. A side wall of the boss 126 is spaced apart from the outer part 122 to constitute a first slot U1. The first tooth 132 is inserted into the first slot U1, passes through the first hole 124, and is positioned in the second space S2. In addition, a side wall of the boss 126 is spaced apart from the inner part 121 to constitute a second slot U2. The second tooth 142 and the third tooth 133 are inserted into the second slot U2, pass through the second hole 125 and the third hole 127, respectively, and are positioned in the second space S2.

In a process in which the first stator tooth 130 is coupled to the stator body 120, the first slot U1 guides the first tooth 132 to the first hole 124 to facilitate the coupling therebetween.

In a process in which the second stator tooth 130 is coupled to the stator body 120, the second slot U2 guides the second tooth 142 and the third tooth 133 to the second hole 125 and the third hole 127, respectively, to facilitate the coupling therebetween.

FIG. 11 is a side view illustrating the first stator tooth, and FIG. 12 is a side view illustrating the second stator tooth.

Referring to FIGS. 5 and 11, the first stator tooth 130 may include the first body 131 and the plurality of first teeth 132 protruding from the first body 131 in the axial direction to be spaced apart from each other.

Referring to FIGS. 5 and 12, the second stator tooth 140 may include the second body 141 and the plurality of second teeth 142 protruding from the second body 141 in the axial direction to be spaced apart from each other.

A height H1 of the first body 131 is smaller than a height H2 of the first tooth 132 based on an upper surface 131a of the first body 131. In addition, a height H3 of the second body 141 is smaller than a height H4 of the second tooth 142 based on an upper surface 141a of the second body 141. However, the present invention is not limited thereto, and the height H2 of the first tooth 132 and the height H4 of the second tooth 142 may also be different.

FIG. 13 is a plan view illustrating the first stator tooth, the second stator tooth, and the magnet.

Referring to FIG. 13, the first stator tooth 130 is disposed outside the second stator tooth 140. The first tooth 132 and the second tooth 142 may be disposed to overlap in the radial direction when viewed in the radial direction (y direction). Such an arrangement of the first tooth 132 and the second tooth 142 has an effect of reducing a leakage of a magnetic flux.

FIG. 14 is a view illustrating a first pole and a second pole of the magnet.

Referring to FIG. 14, the magnet includes first poles 230A and second poles 230B. The first pole 230A and the second pole 230B may be alternately disposed in a circumferential direction of the magnet.

The first poles 230A and the second poles 230B may each include an N-pole region N and an S-pole region S. Each of the first pole 230A and the second pole 230B may have a multi-layer structure in which the N-pole region N and the S-pole region S are divided to be positioned at inner and outer sides.

In the first pole 230A, the N-pole region N may be disposed at a relatively outer side, and the S-pole region S may be disposed at a side further inward than the N-pole region N. In the second pole 230B, the N-pole region N may be disposed at a relatively inner side, and the S-pole region S may be disposed at a side further outward than the N-pole region N.

The N-pole region N of the first pole 230A is disposed adjacent to the S-pole region S of the second pole 230B. The S-pole region S of the first pole 230A is disposed adjacent to the N-pole region N of the second pole 230B.

When the magnet 230 rotates so that the first tooth 132 becomes closer to the S-pole region S and is charged to an S-pole, since the second tooth 142 becomes closer to the N-pole region N, the second tooth 142 is charged to an N-pole. In addition, when the magnet 230 rotates so that the first tooth 132 becomes closer to the N-pole region N and is charged to an N-pole, since the second tooth 142 becomes closer to the S-pole region S, the second tooth 142 is charged to an S-pole. Accordingly, the sensor 500 may measure an angle using a magnetic field applied through the first stator tooth 130, the second stator tooth 140, and a collector 300 (see FIG. 29).

In the sensing device according to the embodiment, the first tooth 132 and the second tooth 142 overlap in the radial direction. Both ends of the second tooth 142 may overlap the first tooth 132. For example, when a position and a size of the first tooth 132 and a position and a size the second tooth 142 are designed, a first angle $\Theta 1$, a second angle $\Theta 2$, and a third angle $\Theta 3$ may be the same.

The first angle $\Theta 1$ denotes an angle formed by both ends of the first pole 230A based on the stator center C. For example, when the number of the first poles 230A is 8, and the number of the second poles 230B is 8, the first angle $\Theta 1$ may be 22.5°.

FIG. 15 is a view illustrating the second angle $\Theta 2$, and FIG. 16 is a view illustrating the third angle $\Theta 3$.

Referring to FIG. 15, the second angle $\Theta 2$ denotes an angle formed by both ends P1 of the first tooth 132 based on the stator center C. A reference point G1 for defining the both ends P1 of the first tooth 132 in the axial direction will be described below. When the first tooth 132 is disposed to face the body 231 of the magnet 230, the reference point G1 corresponds to a point of the first tooth 132 corresponding to a midpoint of the height H1 of the body 231 of the magnet 230. The height H1 of the body 231 of the magnet 230 means a height between an upper surface 231a and a lower surface 231b of the magnet 230 in the axial direction. An angle $\Theta 4$ between the first tooth 132 and the first tooth 132 at the reference point G1 may be the same as the second angle $\Theta 2$.

Referring to FIG. 16, the third angle $\Theta 3$ denotes an angle formed by both ends P2 of the second tooth 142 based on the stator center C. A reference point G2 for defining the both ends P2 of the second tooth 142 in the axial direction will be described below. When the second tooth 142 is disposed to face the body 231 of the magnet 230, the reference point G2 corresponds to a point of the second tooth 142 corresponding to a midpoint of the height H1 of the body 231 of the magnet 230. An angle $\Theta 5$ between the second tooth 142 and the second tooth 142 at the reference point G2 may be the same as the third angle $\Theta 3$.

FIG. 17 is a graph showing a flux versus the first angle $\Theta 1$, the second angle $\Theta 2$, and the third angle $\Theta 3$.

Referring to FIG. 17, it may be seen that, in a state in which the second angle $\Theta 2$ and the third angle $\Theta 3$ are set to be the same, a magnitude of a flux increases as the second angle $\Theta 2$ and the third angle $\Theta 3$ become similar to the first angle $\Theta$, and the magnitude of the flux decreases as the second angle $\Theta 2$ and the third angle $\Theta 3$ become different from the first angle $\Theta 1$. When the size and the position of the first tooth 132 and the size and the position of the second tooth 142 are arranged so that the second angle $\Theta 2$ and the third angle $\Theta 3$ are the same as the first angle $\Theta 1$, it may be seen that the magnitude of the flux of the first and second stator teeth 130 and 140 is highest.

FIG. 18 is an exploded perspective view illustrating the rotor.

Referring to FIGS. 2 and 18, the rotor 200 may include a rotor holder 210, a rotor body 220, and the magnet 230. The rotor holder 210, the rotor body 220, and the magnet 230 may be an integrated part.

The rotor holder 210 may be connected to an input shaft of the electric steering apparatus. Accordingly, the rotor holder 210 may be rotated in conjunction with rotation of the input shaft. The rotor holder 210 may be formed in a cylindrical shape. In addition, an end portion of the rotor holder 210 may be coupled to the rotor body 220. The rotor holder 210 may be formed of a metal material but is not necessarily limited thereto, and the rotor holder 210 may be formed of another material by considering a predetermined strength or more so that the input shaft is fixedly inserted thereinto.

The rotor holder 210 may include a protrusion 211. The protrusion 211 may be disposed to extend from an outer circumferential surface of the rotor holder 210 in the radial direction.

The rotor body 220 is disposed at one side of the outer circumferential surface of the rotor holder 210. The rotor body 220 may be an annular member. A groove 221 may be disposed in an inner circumferential surface of the rotor body 220. The groove 221 is a groove into which the protrusion of the rotor holder 210 is inserted.

The magnet 230 is coupled to the rotor body 220. The magnet 230 is rotated in conjunction with the rotor holder 210 when the rotor holder 210 rotates.

FIG. 19 is a view illustrating the magnet, and FIG. 20 is a plan view illustrating the magnet.

Referring to FIGS. 19 and 20, the magnet 230 may include the ring-shaped body 231 and a protrusion 232 protruding from an upper surface of the body 231. The protrusion 232 may be provided as a plurality of protrusions 232. The protrusion 232 may include a first part 232a and a second part 232b. The first part 232a protrudes upward from the upper surface of the body 231. The second part 232b may be disposed to protrude from the first part 232a in a radial direction of the magnet 230. The second part 232b may protrude inward further than an inner circumferential surface of the body 220. The protrusion 232 is for increasing a coupling force with the rotor body 220. The first part 232a prevents a slip between the rotor body 220 and the magnet 230 in a rotation direction, and the second part 232b prevents separation of the rotor body 220 from the magnet 230 in the axial direction.

FIG. 21 is a perspective view illustrating an arrangement of the magnet with respect to the first stator tooth and the second stator tooth.

Referring to FIG. 21, the magnet 230 is disposed between the first tooth 132 and the second tooth 142. In addition, the magnet 230 is disposed between the third tooth 133 and the first tooth 132.

The body 231 of the magnet 230 is disposed to face the first tooth 132, the second tooth 142, and the third tooth 133. The protrusion 232 of the magnet 230 is disposed at a higher level than the first tooth 132, the second tooth 142, and the third tooth 133.

FIG. 22 is a perspective view illustrating the first stator tooth.

Referring to FIG. 22, the first stator tooth 130 may include the first body 131, the first teeth 132, the third teeth 133, and an extension part 134. The first body 131 may be a ring-shaped member. The first teeth 132 may be disposed to be spaced apart from each other in the circumferential direction and may extend upward from an upper side of the first body 131. The first body 131 and the plurality of first teeth 132 may be integrally formed. The extension part 134 protrudes inward from the first body 131. The third tooth 132 is connected to the extension part 134.

Each of the first tooth 132 and the third tooth 133 may be formed in a shape of which a lower side is wide and an upper side is narrow. For example, when viewed in the radial direction, in each of the first tooth 132 and the third tooth 133, a width of the lower side may be smaller than a width of the upper side. Each of the first tooth 132 and the third tooth 133 may be formed in a trapezoidal shape. In addition, since the first tooth 132 passes through the first hole 124, and the third tooth 133 passes through the third hole 127, the upper surface of the first body 131 and an upper surface of the extension part 134 may be in contact with a lower surface of the partition plate 123.

FIG. 23 is a perspective view illustrating the second stator tooth.

Referring to FIG. 23, the second stator tooth 140 may include the second body 141 and the second teeth 142. The second teeth 142 may be disposed to be spaced apart from each other in the circumferential direction and may extend upward from an upper side of the second tooth 142. The second body 141 and the plurality of second teeth 142 may be integrally formed. The second tooth 142 may be formed in a shape of which a lower side is wide and an upper side is narrow. For example, when viewed in the radial direction, a width of the lower side may be greater than a width of the upper side of the second tooth 142. The second tooth 142 may have a trapezoidal shape.

The second body 141 may include a protruding part 141a. The protruding part 141a may be an annular member bent to protrude outward further than the second tooth 142. The protruding part 141a reduces an air gap between the sensor 500 and the second body 141 to increase an amount of a flux applied to the sensor 500.

FIG. 24 is a plan view illustrating the first stator tooth.

Referring to FIG. 24, a shortest distance R1 from the center C of the first stator tooth 130 to the first tooth 132 is greater than a shortest distance R2 from the center C of the first stator tooth 130 to the third tooth 133. The third tooth 133 is disposed closer to the center C of the first stator tooth 130 than the first tooth 132. This is to guide an external magnetic field introduced from an inner side of the stator holder 110 to the third tooth 133.

FIG. 25 is a plan view illustrating the first stator tooth and the second stator tooth.

Referring to FIG. 25, a diameter D3 formed by the plurality of third teeth 133 is smaller than a diameter D1 formed by the plurality of first teeth 132, and a diameter D2 formed by the plurality of second teeth 142 is smaller than the diameter D1 formed by the plurality of first teeth 132. Based on the magnet 230, the first tooth 132 is disposed outside the magnet 230, and the second tooth 142 and the third tooth 133 are disposed inside the magnet 230.

FIG. 26 is a view illustrating the first tooth, the second tooth, and the third tooth which are concentrically disposed.

Referring to FIG. 26, the first tooth 132, the second tooth 142, and the third tooth 133 may be concentrically disposed. The second tooth 142 and the third tooth 133 may be disposed on a virtual first circumference O1, and the first tooth 132 may be disposed on a virtual second circumference O2 different from the virtual first circumference O1. The second tooth 142 and the third tooth 133 may be alternately disposed in a circumferential direction of the stator 100. The first circumference O1 is disposed inside the second circumference O2. This is to disperse the external magnetic field introduced from the inner side of the stator holder 110 in all directions through the second teeth 142 and the third teeth 133.

Meanwhile, a width t3 of a lower end of the third tooth 133 in the circumferential direction may be smaller than a width t1 of a lower end of the first tooth 132 in the circumferential direction. In addition, the width t3 of the lower end of the third tooth 133 in the circumferential direction may be smaller than a width t2 of a lower end of the second tooth 142 in the circumferential direction.

FIG. 27 is a plan view which illustrates a flow of the external magnetic field introduced from the inner side of the stator holder and illustrates the first stator tooth and the second stator tooth, and FIG. 28 is a cross-sectional view which illustrates a flow of an external magnetic field guided to the third tooth and illustrates the first stator tooth.

Referring to FIG. 27, external magnetic fields W1 and W2 introduced along the stator holder 110 flow toward the first stator tooth 130 and the second stator tooth 140 in a radial direction of the stator 200. The external magnetic fields W1 and W2 are guided to be dispersed to the second teeth 142 and the third teeth 133.

Referring to FIG. 28, the external magnetic field W1 flowing into the third tooth 133 is guided to the extension part 134. In this case, an external magnetic field M1 flowing into the third tooth 133 may be offset by an external magnetic field M2 introduced from the magnet 230 to the first tooth 132 and guided to the extension part 134. As described above, since the external magnetic field introduced along stator holder 110 is guided to the first stator tooth 130 and is offset, there is an advantage of considerably reducing an influence of the external magnetic field on the sensor 500.

In <Table 1> below, a torque of Comparative example and a torque of Example are compared.

TABLE 1

| | Torque of Comparative Example (Nm) | Torque of Example (Nm) |
|---|---|---|
| External Magnetic Field in Radial Direction 1000 A/m | 0.41 Nm | 0.05 Nm |

In Comparative example, a sensing device does not include a structure like the third tooth 133. In Example, the sensing device includes the third tooth 133. When there is no external magnetic field in the radial direction, a torque of 0 Nm is normal. When an external magnetic field of 1000 A/m is applied to Comparative example and Example in the radial direction, a torque of 0.41 Nm is measured in Comparative example so that it may be seen that Comparative example is greatly affected by the external magnetic field. However, in the case of Example, the measured torque is 0.05 Nm, and thus it may be seen that Example is hardly affected by the external magnetic field.

FIG. 29 shows side cross-sectional views illustrating the first stator tooth, the second stator tooth, the sensor, and the collector.

Referring to FIG. 29, only one collector 300 is disposed between the first stator tooth 130 and the second stator tooth 140. In addition, in order to increase a flux applied to the sensor 500, the protruding part 141a is disposed on the second stator tooth 140.

When the collector 300 is disposed inside the sensor 500 to be spaced apart from the first stator tooth 130, there is an advantage in that the sensing device 1 is less affected by an external magnetic field introduced from an external device in the radial direction. In addition, since the protruding part 141a is bent outward in the radial direction, the air gap between the protruding part 141a and the stator holder 110 increases, and thus there is an advantage of reducing an influence of the external magnetic field introduced through the stator holder 110.

Since one collector 300 is disposed between the sensor 500 and the second body 142, a structure of the sensing device can be simplified, a size of the sensing device can be decreased, a manufacturing process and a manufacturing cost can be reduced, and performance of the sensing device can also be secured when compared to a case in which two collectors are disposed therein.

FIG. 30 is a view illustrating the collector.

Referring to FIG. 30, the collector 300 collects a flux of the stator 100. In this case, the collector 300 may be formed of a metal material. The collector 300 may be a semicircular member. The collector 300 may include a first body 310, a second body 320, and extension parts 330. The first body 310 and the second body 320 are disposed to face the sensor 500. The second body 320 may extend from the first body 310. The extension parts 330 may extend from the first body 310 and the second body 320. Each of the first body 310 and the second body 320 may include a flat surface having a flat shape. The extension part 330 may include a curved surface.

The extension parts 330 may include bent parts 340. The bent part 340 may be disposed to be bent outward from an end of the extension part 330. The bent part 340 is for coupling the housing 700 and the collector 300.

FIG. 31 is a view illustrating the collector disposed between the first stator tooth and the second stator tooth, wherein a first region of the first stator tooth and a second region of the second stator tooth are illustrated.

Referring to FIGS. 30 and 31, the first stator tooth 130 may include a first region R1. The second stator tooth 140 may include a second region R2. The first region R1 is a region in which the first stator tooth 130 corresponds to the collector 300 in the circumferential direction of the stator 100. The second region R2 is a region in which the second stator tooth 140 corresponds to the collector 300 in the circumferential direction of the stator. The first region R1 is disposed so that a central angle thereof is 180° or less about the center C of the stator 100 in the circumferential direction. The second region R2 is disposed so that a central angle is 180° or less about the center C of the stator 100 in the circumferential direction.

The sensor 500 detects a change in magnetic field generated between the stator 100 and the rotor 200. The sensor 500 may be a Hall integrated circuit (IC). The sensor 500 detects a magnetization amount of the stator 100 generated due to an electrical interaction between the magnet 230 of the rotor 200 and the stator 100. The sensing device 1 measures a torque on the basis of the detected magnetization amount.

The sensor 500 may include a first sensor 510 and a second sensor 520. The first sensor 510 may include a first-1 sensor 511 and a first-2 sensor 512. The second sensor 520 may include a second-1 sensor 521 and a second-2 sensor 522. The first sensor 510 is disposed opposite to the first body 310. The second sensor 520 is disposed opposite to the second body 320.

FIG. 32 is a view illustrating the collector disposed between the first stator tooth and the second stator tooth, wherein a position of the collector with respect to a first reference line and a second reference line is illustrated.

Referring to FIGS. 30 and 32, the collector 300 may include a first collector 300A and a second collector 300B. The first collector 300A includes the first body 310. The second collector 300B includes the second body 320. The first collector 300A and the second collector 300B may be symmetrically disposed with respect to a second reference line B2. In addition, each of the first collector 300A and the second collector 300B may be disposed at only one side of a first reference line B1, and each of a part of the first collector 300A and a part of the second collector 300B may be disposed not to extend to the other side of the first reference line B1. In this case, the first reference line B1 means a virtual line passing through the center C of the stator in the radial direction, and the second reference line B2 means a virtual line which passes through the center C of the stator in the radial direction and is perpendicular to the first reference line B1.

FIG. 33 is a view illustrating a shape of the collector with respect to a curvature center of the extension part of the collector.

Referring to FIG. 33, the extension part 330 of the collector 300 may include the curved surface. The collector 300 may be formed so that an angle R3 formed by both ends of the extension part 330 about the curvature center of the extension part 330 is 180° or less.

FIG. 34 is a view illustrating the housing in which the collector and the sensor are disposed, FIG. 35 is a view illustrating a groove in a protrusion disposed in the housing illustrated in FIG. 34, and FIG. 36 is a bottom view illustrating the housing illustrated in FIG. 34.

Referring to FIGS. 34 to 36, the housing 700 may include a housing body 710 and a protrusion 720. The housing body 710 has a plate shape including an upper surface 711 and a lower surface 712 and has a form of which an upper portion and a lower portion are open. A hole 713 is disposed in a center of the housing body 710. The stator holder 110 is positioned inside the hole 713. The circuit board 600 may be installed on the lower surface 712 of the housing body 710. The sensor 500 is installed on the circuit board 600. The sensor 500 may pass through the housing 700 and may be disposed on the upper surface 711 of the housing 700. A cover may be coupled to a lower side of the housing body 710 and may cover the circuit board 600.

The protrusion 720 may protrude from the upper surface 711 of the housing 700 in the axial direction. The protrusion 720 is disposed along a circumference of the hole 713. The protrusion 720 may be an annular member. An inner circumferential surface of the protrusion 720 may be in contact with an outer circumferential surface of the collector 300.

Referring to FIG. 35, the protrusion 720 may include a groove 721. The groove 721 may be concavely formed in the inner circumferential surface of the protrusion 720. Two grooves 721 may be disposed. The bent parts 340 of the collector 300 are coupled to the grooves 721.

Referring to FIG. 36, the housing 700 may include a first hole 731 through which the first sensor 510 passes and a second hole 732 through which the second sensor 520 passes. The first hole 731 and the second hole 732 are formed to pass through the upper surface 711 and the lower surface 712 of the body of the housing 700. In addition, the first hole 731 and the second hole 732 may be connected to be bent.

FIG. 37 is a view illustrating a relative position of the collector with respect to the first stator tooth and the second stator tooth when the collector moves to any one side, and FIG. 38 is a view illustrating a relative position of the collector with respect to the first stator tooth and the second stator tooth when the collector moves to the other side.

Referring to FIG. 37, for example, when the housing 700 moves leftward with respect to the center C of the stator 100 in the drawing, the collector 300 also moves leftward in conjunction with the housing 700. When the collector 300 moves so that a position of any one point of the collector 300 moves from a point P1 (see FIG. 37) to a point P2 (see FIG. 37), the entire collector 300 becomes closer to the first stator tooth 130 but becomes farther away from the second stator tooth 140 at the same time. Accordingly, an amount of a change in sensitivity to a magnetic flux measured by the sensor 500 is not large.

Conversely, referring to FIG. 38, when the housing 700 moves rightward with respect to the center C of the stator 100 in the drawing, a position of any one point of the collector 300 moves from the point P1 (see FIG. 38) to a point P3 (see FIG. 38) so that the entire collector 300 becomes farther away from the first stator tooth 130 but becomes closer to the second stator tooth 140. Accordingly, an amount of a change in sensitivity to a magnetic flux measured by the sensor 500 is not large.

In this case, the sensitivity to the measured magnetic flux means a degree of a change in measured magnetic flux corresponding to a relative rotation angle between the stator 100 and the rotor 200.

As described above, the reason why the amount of a change in sensitivity to the measured magnetic flux is not large even when the collector 300 moves is that the collector 300 is disposed at only any one side with respect to the reference line passing through the center C of the stator 100 as illustrated in FIGS. 31 to 33.

When an entire shape of the collector 300 is an arc shape or annular shape disposed over both regions divided by the reference line passing through the center C of the stator 100, and when the collector 300 moves leftward in the drawing as in FIG. 37, one region of the collector 300 disposed at any one side with respect to the reference line passing through the center C of the stator 100 becomes closer to the first stator tooth 130, and the other region of the collector 300 disposed at the other side with respect to the reference line passing through the center C of the stator 100 becomes closer to the second stator tooth 140 at the same time.

Thus, since a gap between the collector 300 and the first stator tooth 130 is reduced, and a gap between the collector 300 and the second stator tooth 140 is reduced at the same time, there is a problem in that sensitivity to a magnetic flux to be measured is greatly increased. However, in the sensing device according to the embodiment, since the collector 300 is disposed at any one side with respect to the reference line passing through the center C of the stator 100, there is an advantage of fundamentally eliminating such a problem.

FIG. 39 is a comparison graph of sensitivity to a magnetic flux measured by the sensing device according to Example and a sensing device according to Comparative example.

Referring to FIGS. 31 and 39, Example 1, Example 2, Example 3, and Example 4 show sensitivity to a magnetic flux measured by the first-1 sensor 511, the first-2 sensor 512, the second-1 sensor 521, and the second-2 sensor 522 according to movement of the housing 700. Comparative example 1, Comparative example 2, Comparative example 3, and Comparative example 4 show sensitivity to a magnetic flux measured by four sensors of a sensing device including a collector having an annular shape.

In the case of Comparative examples 1 to 4, as movement of the housing 700 is enlarged, sensitivity to a magnetic flux to be measured is greatly increased. However, it may be seen that sensitivity to a magnetic flux to be measured in Examples 1 to 4 is not considerably increased even when movement of the housing 700 is enlarged. In the case of Examples 1 to 4, it may be seen that the sensitivity to the measured magnetic flux is decreased by about 70% to 80% when compared to Comparative examples 1 to 4.

FIG. 40 is a view illustrating the first gear and the second gear which are engaged with the main gear.

Referring to FIGS. 2 and 40, the sensing device 1 includes the first gear 1100 and the second gear 1200 as sub-gears engaged with the main gear 121. The main gear 121, the first gear 1100, the second gear 1200, and third sensors 610 are for measuring an angle of the steering shaft.

The main gear 121, the first gear 1100, and the second gear 1200 are engaged with each other and rotate. The main gear 121 is disposed on the outer circumferential surface of the stator body 120. The first gear 1100 and the second gear 1200 are rotatably disposed on the housing body 710. Gear ratios between the main gear 121, the first gear 1100, and the second gear 1200 are determined in advance. For example, when a total angle of the main gear 121 is 1620°, the first gear 1100 and the second gear 1200 may be respectively designed to rotate 15.6 times and 14.625 times when the main gear 121 rotates 4.5 times. In this case, the total angle is an angle calculated by accumulating rotation of the main gear 121 when all the gears return to states before rotating.

Magnets may be disposed on the first gear 1100 and the second gear 1200. The magnets are disposed to face the third sensors 610. The third sensors 610 are mounted on the circuit board.

FIG. 41 is a view illustrating a direction of an external magnetic field with respect to the stator tooth, FIG. 42 is a view illustrating an avoidance state of the sensor from an external magnetic field having a z-axis, and FIG. 43 is a view illustrating an avoidance state of the first and second stator teeth from an external magnetic field having a y'-axis.

Referring to FIG. 41, an external magnetic field greatly affects the sensing device in a z-axis direction which is the axial direction and in a y'-axis direction perpendicular to the z-axis direction. In this case, the y'-axis direction means a direction toward the sensor 500 in the radial direction perpendicular to the axial direction.

Referring to FIG. 42, the sensing device 500 according to the embodiment is disposed in a state in which the sensor 500 is erected in the z-axis direction. Accordingly, an area of the sensor 500 when viewed in the z-axis direction is considerably smaller than an area of the sensor 500 when viewed in the y'-axis direction. Accordingly, the sensing device according to the embodiment has an advantage in that an influence of the external magnetic field on the sensor 500 is inevitably small in the z-axis direction.

Referring to FIG. 43, an external magnetic field in the y'-axis direction may greatly affect the sensor 500 due to the state in which the sensor 500 is erected in the z-axis direction. However, since the external magnetic field in the y'-axis direction is induced along the first stator tooth 130 and the second stator tooth 140, the external magnetic field flows without affecting the sensor 500. Accordingly, the sensing device according to the embodiment has an advantage in that an influence of the external magnetic field on the sensor 500 is small even in the y'-axis direction.

FIG. 44 is a comparison graph of an amount of a change in angle according to an external magnetic field in the z-axis direction between Comparative example and Example.

Referring to FIG. 44, in the case of Comparative example in which the sensing device has a structure including a stator tooth disposed vertically and a sensor disposed to lie down, it may be seen that an amount of a change in angle increases linearly as the external magnetic field increases in the z-axis direction so that a measured angle is greatly changed according to the external magnetic field.

However, in the case of Example, it may be seen that, even when the external magnetic field in the z-axis direction increases, an angle is hardly changed, and thus the sensing device is not affected by the external magnetic field.

FIG. 45 is a comparison graph of an amount of a change in angle according to an external magnetic field in the y'-axis direction between Comparative example and Example.

Referring to FIG. 45, in the case of Comparative example in which the sensing device has the structure including the stator tooth disposed vertically and the sensor disposed to lie down, it may be seen that an amount of a change in angle increases linearly as the external magnetic field in the y'-axis direction increases so that a measure angle is greatly changed according to the external magnetic field.

However, in the case of Example, it may be seen that, even when the external magnetic field in the y'-axis direction increases, an angle is hardly changed, and thus the sensing device is not affected by the external magnetic field.

REFERENCE NUMERALS

100: STATOR
110: STATOR HOLDER
120: STATOR BODY
130: FIRST STATOR TOOTH
140: SECOND STATOR TOOTH
200: ROTOR
210: ROTOR HOLDER
220: ROTOR BODY
230: MAGNET
300: COLLECTOR
500: SENSOR
600: CIRCUIT BOARD
700: HOUSING

The invention claimed is:

1. A sensing device comprising:
a stator including a stator tooth; and
a rotor including a magnet,
wherein the stator tooth includes a first stator tooth and a second stator tooth disposed inside the first stator tooth,
the first stator tooth includes a plurality of first teeth,
the second stator tooth includes a plurality of second teeth,
the first stator tooth overlaps the stator second tooth in a radial direction from a center of the stator,
the sensing device further comprises a sensor and a collector which are disposed between the first stator tooth and the second stator tooth in the radial direction,
when a virtual line passing through the center of the stator in the radial direction is defined as a first reference line and a virtual line perpendicular to the first reference line in the radial direction is defined as a second reference line,
wherein the collector is symmetrically disposed with respect to the second reference line at only one side of the first reference line,
wherein the sensor includes a first sensor and a second sensor,
wherein the first sensor is disposed with respect to the second reference line at one side of the second reference line, and
wherein the second sensor is disposed with respect to the second reference line at other side of the second reference line.

2. The sensing device of claim 1, wherein
the collector includes a first body disposed opposite to the first sensor, a second body extending from the first body and disposed opposite to the second sensor, and extension parts extending from the first body and the second body, and
an angle formed by both ends of the collector based on a curvature center of the extension part is 180° or less.

3. The sensing device of claim 1, wherein:
the collector includes a first body disposed opposite to the first sensor, a second body extending from the first body and disposed opposite to the second sensor, and extension parts extending from the first body and the second body.

4. The sensing device of claim 1, wherein:
the collector includes a first collector and a second collector;
the first collector includes a first body disposed opposite to the first sensor and a first extension part extending from the first body; and
the second collector includes a second body disposed opposite to the second sensor and a second extension part extending from the second body.

5. The sensing device of claim 3, wherein the first body and the second body are connected to be bent.

6. The sensing device of claim 5, further comprising a housing configured to accommodate a circuit board,
   wherein the housing includes a first hole through which the first sensor passes and a second hole through which the second sensor passes, and
   the first hole and the second hole are placed to form an angle.

7. The sensing device of claim 1, further comprising a housing configured to accommodate a circuit board,
   wherein the collector includes bent parts disposed at both ends to be bent outward, and
   the housing includes grooves in which the bent parts are disposed.

8. The sensing device of claim 7, wherein:
   the housing includes a protrusion having an annular shape protruding in an axial direction; and
   the grooves are concavely disposed in an inner circumferential surface of the protrusion.

9. The sensing device of claim 1, wherein the sensor is disposed between the collector and the first stator tooth in the radial direction.

10. The sensing device of claim 1, wherein:
    the first stator tooth includes a first region, and the second stator tooth includes a second region,
    wherein the first region corresponds to the collector in a circumferential direction,
    wherein the second region corresponds to the collector in the circumferential direction, and
    wherein each of a central angle of the first region and a central angle of the second region is 180° or less.

* * * * *